US010795994B2

(12) United States Patent
Mehta et al.

(10) Patent No.: US 10,795,994 B2
(45) Date of Patent: Oct. 6, 2020

(54) DETECTING RANSOMWARE

(71) Applicant: McAfee, LLC, Santa Clara, CA (US)

(72) Inventors: Kunal Mehta, Hillsboro, OR (US);
Sherin Mary Mathews, Santa Clara, CA (US); Carl D. Woodward, Santa Clara, CA (US); Celeste R. Fralick, Lubbock, TX (US); Jonathan B. King, Hillsboro, OR (US)

(73) Assignee: McAfee, LLC, Santa Clara, CA (US)

( * ) Notice: Subject to any disclaimer, the term of this patent is extended or adjusted under 35 U.S.C. 154(b) by 197 days.

(21) Appl. No.: 16/142,316

(22) Filed: Sep. 26, 2018

(65) Prior Publication Data

US 2020/0097653 A1 Mar. 26, 2020

(51) Int. Cl.
*G06F 21/56* (2013.01)
*G06N 3/08* (2006.01)

(52) U.S. Cl.
CPC ............. *G06F 21/56* (2013.01); *G06N 3/08* (2013.01); *G06F 2221/034* (2013.01)

(58) Field of Classification Search
CPC ...... G06F 21/56; G06F 2221/034; G06N 3/08
USPC ......................................................... 726/23
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 7,392,544 | B1 | 6/2008 | Pavlyushchik |
| 7,506,155 | B1 | 3/2009 | Stewart et al. |
| 9,910,986 | B1 | 3/2018 | Saxe et al. |
| 10,140,553 | B1* | 11/2018 | Vasisht ..................... G06N 3/02 |
| 2009/0013405 | A1* | 1/2009 | Schipka ................ G06F 21/562 726/22 |
| 2012/0150793 | A1* | 6/2012 | Carroll .................. G06F 16/122 707/602 |
| 2014/0298470 | A1* | 10/2014 | Yablokov ................ G06F 21/56 726/24 |
| 2015/0248556 | A1 | 9/2015 | Sickendick et al. |
| 2018/0349796 | A1* | 12/2018 | Gibbs .................... G06N 20/00 |

(Continued)

OTHER PUBLICATIONS

International Search Report and Written Opinion in International Application No. PCT/US2019/052344 dated Jan. 14, 2020, 10 pages.

*Primary Examiner* — Michael S McNally
(74) *Attorney, Agent, or Firm* — Patent Capital Group

(57) ABSTRACT

There is disclosed in one example a ransomware mitigation engine, including: a processor; a convolutional neural network configured to provide file type identification (FTI) services including: identifying an access operation of a file as a write to the file or newly creating the file; computing a byte correlation factor for the file; classifying the file as belonging to a file type; determining with a screening confidence that the file type is correct for the file; determining that the screening confidence is below a screening confidence threshold; and circuitry and logic to provide heuristic analysis including: receiving notification that the confidence is below the confidence threshold; performing a statistical analysis of the file to determine a difference between an expected value and a computed value; determining from the difference, with a detection confidence, that the file has been compromised; and identifying the file as having been compromised by a ransomware attack.

20 Claims, 10 Drawing Sheets

(56) References Cited

U.S. PATENT DOCUMENTS

2019/0236273 A1\* 8/2019 Saxe .................. G06F 21/56
2020/0042645 A1\* 2/2020 Douthit ............... G06F 16/93

\* cited by examiner

DETECTING RANSOMWARE

FIELD OF THE SPECIFICATION

This disclosure relates in general to the field of computer security, and more particularly, though not exclusively, to a system and method for detecting ransomware.

BACKGROUND

Modern computers often have always-on Internet connections. Such connections can provide multiple vectors for security threats to attack a system.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
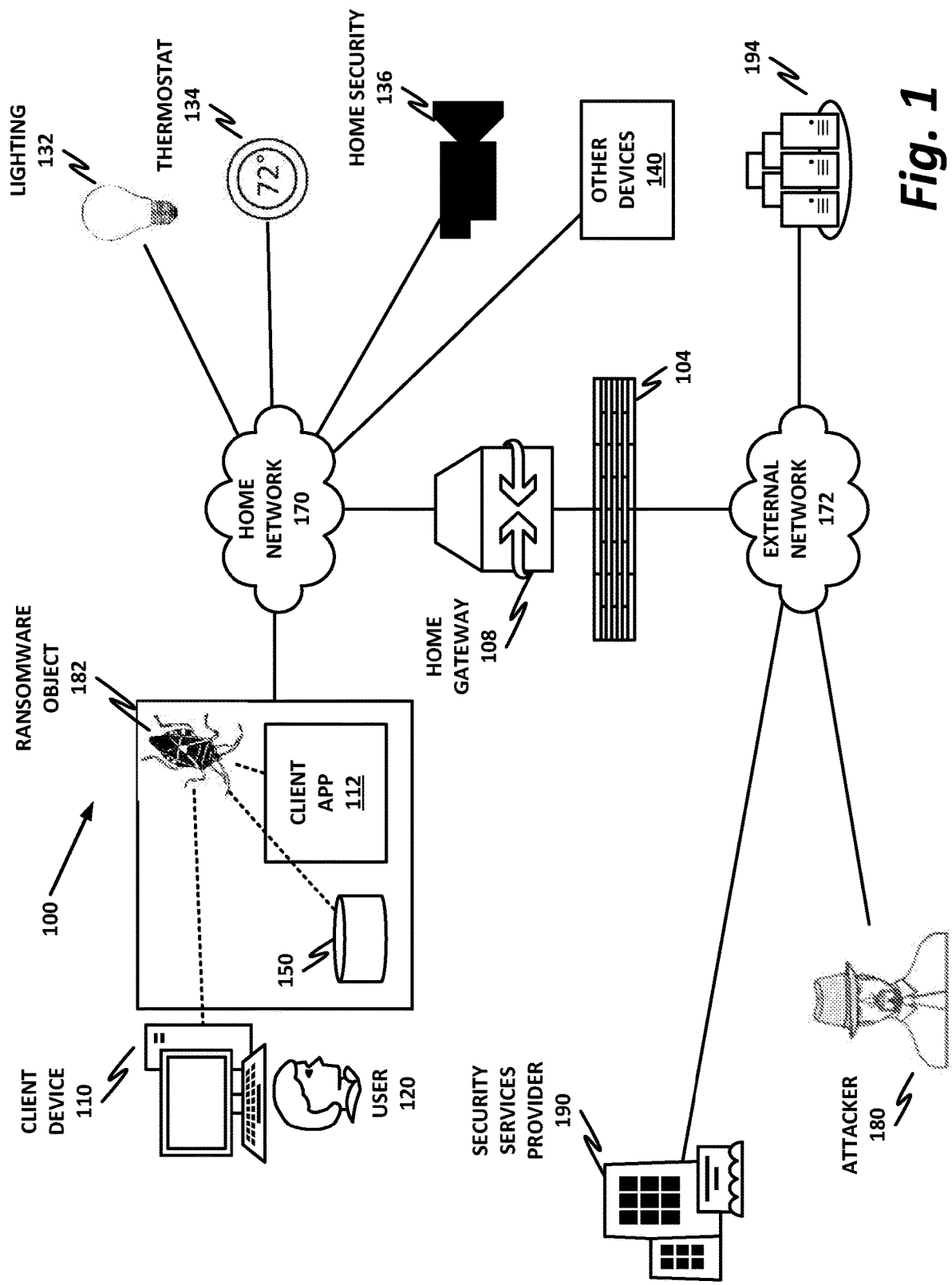
FIG. 1 is a block diagram of a home network, according to the teachings of the present specification.

In an example, there is disclosed a ransomware mitigation engine, comprising: a processor; a convolutional neural network configured to provide file type identification (FTI) services comprising: identifying an access operation of a file as a write to the file or newly creating the file; computing a byte correlation factor for the file; classifying the file as belonging to a file type; determining with a screening confidence that the file type is correct for the file; determining that the screening confidence is below a screening confidence threshold; and circuitry and logic to provide heuristic analysis comprising: receiving notification that the confidence is below the confidence threshold; performing a statistical analysis of the file to determine a difference between an expected value and a computed value; determining from the difference, with a detection confidence, that the file has been compromised; and identifying the file as having been compromised by a ransomware attack.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Ransomware is a particularly nefarious species of modern malware. Some of the more traditional models for malware are directed toward one of two models. The first is to compromise the user's machine, and turn that machine into a 'bot' to use for the malware author's purposes. This can include turning machines into spambots, mining bots, or other bots that exploit the machine's processing power. The other model is to compromise the user's data, collect the user's data, and sell the data to third-party bad actors, who then exploit the data for commercial purposes.

In contrast, ransomware operates on the principle that the user's data may be most valuable to the user himself or herself. Some forms of ransomware will hold the user's data hostage, and threaten to release the user's data if the user does not pay a ransom. But one limitation of this model is that once the ransom has been paid, there is no way for the user to verify that the data will not be released as promised. Thus, this model of ransomware suffers from a fundamental trust issue.

Another model of ransomware is to deny the user access to his or her own data, and promise to provide access only if the user pays a ransom. While this model also suffers from trust issues, the user at least is able to verify once the data have been unlocked.

Some of the simpler forms of ransomware rely on relatively naïve denial techniques, such as changing the user's password. These naïve techniques are trivially defeated, for example by mounting the drive on an external computer, or logging in as a different user and copying the data. But more sophisticated forms of ransomware encrypt the user's data using a strong encryption algorithm known only to the attacker. The attacker may then demand hundreds or thousands of dollars in exchange for the decryption key that will allow the user to once again access the data. One difficulty with this form of ransomware attack is that it is resistant to normal data recovery techniques, such as backups. Incremental backups keep copies of the user's data, but when a file is encrypted and then stored with the same name and extension as the original file, the encrypted file overwrites the good file in the next incremental backup. Even a quality cloud backup solution that maintains a number of file versions can be susceptible to this type of attack, as it may be impractical or problematic for users to find and restore a last good version of every file in a directory structure that may have many thousands of individual files.

One particularly damaging aspect of ransomware is that it cannot be defeated by simply resetting the computer or the operating system to a known good state. Even if the device itself can be restored to a known good state, the user's original data and/or their backups may still be encrypted.

Because ransomware is such a nefarious species of malware, it is a topic of particular interest to antivirus and anti-malware vendors such as McAfee®, Inc. and its competitors. Various anti-malware providers have developed ransomware solutions, including heuristic analysis, statistical analysis, whitelists, and blacklists, by way of illustrative and nonlimiting example.

A heuristic system monitors file input/output (I/O) patterns (such as read/write/delete/rename) and frequencies. The I/O patterns can be compared to heuristic models to detect irregularities in the pattern.

But ransomware authors have found workarounds to these heuristic solutions. For example, ransomware may monitor a machine to determine when it becomes idle (e.g., with no keyboard and/or mouse I/O). The ransomware may operate when the machine is idle, and rather than encrypt all files at once (which is easily detectable via heuristics), it may encrypt files only at certain intervals or once the machine is idle. Because the encryption does not take place in a single large burst, but rather operates on files at piecewise intervals and avoids excessive loading on the machine, this type of ransomware attack can be difficult to distinguish from ordinary file activity.

Some older ransomware attacks also change file extensions to indicate which files have been encrypted. But not only does this flag the user that something has changed, it is also easy for a heuristic model to detect. So newer ransomware attacks refrain from changing file extensions after encryption. For example, an older ransomware attack might have operated on a user's folder containing a wedding photo album. This could be populated with hundreds of JPEG files, each with the extension 'jpg.' The ransomware attack might attempt to encrypt all of these JPEG files at once, and might change the file name extension for each file to jpg.enc. But this attack would be relatively easy to detect with a heuristic model, because there would be numerous file operations and heavy processor and memory usage all at once, and the file name extensions would be changed. Furthermore, because the file name extensions are changed, this attack would be relatively easy to defeat by simply restoring from a cloud backup. While the incremental cloud backup might have backed up the jpg.enc files, it would be relatively easy to restore all files excluding those with the jpg.enc extension. Thus, a more sophisticated ransomware attack may incrementally encrypt the wedding album files, being careful to limit its use of processor and memory space, and maintain the .jpg extension on those files. When the user later attempts to open one of these files, the file will simply be unreadable because it is encrypted. But if the file is decrypted with the correct decryption key, then it will revert to a usable JPG file. This can be difficult to detect heuristically.

Static analysis-based solutions scan process memory (either before unpacking or after unpacking) to look for known artefacts. Ideally, these artefacts are identified as malicious artefacts before the malicious process can encrypt a file. An example of an artefact may include commonly used strings that are often displayed by a ransomware binary after encrypting files. These strings may constitute a ransom note, including instructions for making payment via Bitcoin, Tor, Wallet, or similar. This ransom note may also include instructions for receiving a decryption key to decrypt the files.

Static analysis-based solutions are similar in many respects to other known malware solutions. While they are beneficial and useful, they can also be defeated. For example, when a malware author learns that static analysis tools look for these commonly used strings in the ransom note text, he or she may decide not to store the ransom note text with the binary itself. Rather, after completing the encryption operation, the ransomware binary may download the ransom note, for example from a command-and-control (C2) server. At this point, detection of the binary is moot, because the damage has already been done. The files have already been encrypted.

Whitelist and blacklist-based solutions rely on access control policies to restrict access to certain files and directories on a system, or to allow access only to selected processes. For example, Microsoft's controlled folder access, dynamic application control by McAfee®, and Linux-based, security-enhanced SELinux all provide species of such access control. While this access control policy solution is beneficial for large enterprises with dedicated information technology (IT) services, it is much more difficult for small enterprises or for individual users who may not have a full-time IT staff to manage such access control policies. Furthermore, it may be noisy and difficult to maintain a list of blacklisted and whitelisted processes, as each user is different from every other user, and file and folder requirements may be different across different users.

To achieve maximum security, it would be theoretically necessary to provide individual access control for each file and folder on the system. This would essentially entail providing a whitelist of processes that are permitted to modify each individual file and folder. In a practical, large-scale system, this is not a feasible solution. Furthermore, simply giving access to trusted processes may not solve the problem, as ransomware objects may inject themselves into trusted processes, or may use trusted script hosts like JavaScript, Visual Basic, Python, and PowerShell.

The present specification describes a method that may supplement and/or replace the existing methods for identifying and mitigating ransomware attacks. Because those existing solutions can be bypassed or spooked by ransomware binaries, it can be difficult and noisy to control access permission policies. It can also be difficult to maintain accurate heuristic models for generic detection logic. The teachings herein provide an operating system and file system agnostic way of classifying an application as behaving like ransomware or not. The application need not be previously known or trusted. In other words, even a 'zero-day' ransomware exploit (defined as malware that takes advantage of a vulnerability in hardware or software before developers can provide an appropriate solution) can be mitigated with the method provided.

The method disclosed herein closely analyzes file content, and when a file is written or newly created on the disk by an application, a ransomware mitigation engine determines (e.g., with a percent confidence) whether the file has been compromised by a ransomware attack. If the ransomware mitigation engine determines that the file has been compromised, then the process instigating the file access may itself be marked as ransomware or as compromised. The file analysis can be accomplished by using a novel featureless or deep learning machine learning layer, which may combine with a heuristic layer to check the byte distribution in the file content. This deep file analysis provides advantages over existing solutions that are often purely heuristic models or frameworks for taking a data backup or establishing access control policies to restricted folders.

The deep file analysis model relies in part on the principle that defined file types have defined formats, as well as specific types of byte distributions in their content. For example, a text file may have a certain specified byte distribution, while a multimedia file would have a different specified byte distribution. Archive files may have yet another type of byte distribution, or the byte distribution may be essentially random, whereas encrypted or obfuscated files may have yet another type of byte distribution, with a byte correlation factor near zero.

A ransomware mitigation engine of the present specification may analyze file content whenever a process writes to a file or creates a new file. In some cases, this analysis may be performed by a convolutional neural network (a species of deep learning algorithm) file type identification (FTI), or content classification layer. This may be followed by a statistical analysis heuristic layer, which predicts whether the file appears to be encrypted by examining the byte distribution.

If the FTI layer predicts a known file format with a strong percentage confidence, then the file I/O is allowed. If the confidence is weak, or if the FTI layer predicts an unknown format or an encrypted data format, the heuristic layer may perform its statistical analysis to further check whether the file content looks to be encrypted. The heuristic layer may look for various byte distribution mathematical parameters. If the heuristic layer finds encrypted content, the file I/O may be denied, and a detection event may be raised. The file content may also be reverted from a backup. On the other hand, if the heuristic layer finds that the content is likely not encrypted or tampered with, then the file I/O operation may be allowed, and the instant backup may be deleted.

The method disclosed in the present specification provides a generic and scalable solution for monitoring file I/O across an entire machine in a performant way. The method does not require heuristic analysis of application behavior. Rather, it identifies a file format or checks whether the format of a file is intact after the file has been written to or created by a process. If the file format seems to be unknown or weakly classified, then the ransomware mitigation engine may analyze file content and conclude whether it is encrypted or not. The ransomware mitigation engine may also regularly collect telemetry so that it can learn new file formats and improve on false positives in the long run. This provides for more and better file type identification at runtime within the neural network. Advantageously, the method disclosed may be agnostic to the operating system platform and file system. This is because the analysis of the file is at the level of the contents of the file, rather than at the operating system or metadata level of the file system.

The ransomware mitigation engine of the present specification may be provided in some examples in conjunction with, or in addition to, an existing anti-malware or antivirus solution installed on a client computer. For example, a client may have an existing antivirus suite such as McAfee® Total Protection. The client device may interface or communicate with a server-side service, such as an enterprise security server, or a server operated by a security services vendor. The functions described below in connection with a ransomware mitigation engine are described in some cases in terms of a monolithic or unitary method. It should be understood, however, that the method described herein may be divided along various different lines between a client computer and a server-side computer. For example, the client computer may include operating system hooks that detect file I/O operations, including the creation of a new file or a write to an existing file, and subject the file to analysis by a FTI layer, which may be located locally or remotely on a server.

In an illustrative embodiment, no portion of the file is uploaded to the server, and the full file is not read locally, as this could impact performance (though this does not preclude embodiments that could operate on the full file where resources are available to do so).

When a new file is created on system or when an existing file is overwritten to the system, the filter driver receives a synchronous notification of the action. In this synchronous path, the system may use stealth file reading capabilities to read some portions of the file (e.g., a few bytes from the start of file, a few bytes from the end of the file, and a few bytes randomly selected from within the file). These small portions can be provided to an artefacts extractor, which computes some mathematical parameters such as (for example), entropy, entropy, Monte Carlo pi, Monte Carlo pi approximation error, serial correlation coefficient, arithmetic mean, chi square distribution, or fuzzy hash (fuzzy hash is particularly useful in the case of an overwrite).

The system may also attempt to extract a file header (magic bytes) from the file content, along with a file name extension (e.g., files of type '.mp3' should have an MP3-style header).

Furthermore, the system may take a hash of the process (and also list of dynamic link libraries (DLLs) or other shared libraries loaded in process) that created or overwrote the file. The system may also collect some heuristic data, such as the total number of files being touched by process in last few seconds or minutes.

When more detailed server-side analysis is required, these heuristics parameters may be sent to the cloud-based FTI convolutional neural network (CNN) or deep neural network (DNN) engine (e.g., in a JSON/XML document). These same artefacts, along with the verdict from cloud-based FTI engine, may be used as inputs to a local heuristic engine.

Note however that in some cases, a copy of the file could be uploaded to a security server for deep analysis. In other embodiments, the file could be partially characterized on the local machine, and characteristic data could then be uploaded to the server for further analysis within a CNN.

The CNN of the ransomware mitigation engine provides an FTI layer, which may also be called a content classification layer. In one embodiment, this is a featureless neural network or deep learning layer, which has been trained with various possible or prevalent file formats. These can include, by way of illustrative and nonlimiting example, text files, audio files, MP3s, video files, image files, word processing documents, other word processing and/or office application formats, archives, databases, cookies, bookmarks, save states for games, configuration files, and other text or binary file formats. To further train the CNN, it may also be provided with samples of these same files that have been encrypted or tampered with by various known ransomware families.

The ransomware mitigation engine may also include a statistical analysis heuristic layer. This layer may be used to predict whether the file appears to be encrypted, or otherwise tampered with. This can include looking at attributes related to file headers, file properties, or particularly to byte distributions within the file. Based on these byte distributions, the heuristic layer may determine with a statistical confidence whether the file has been compromised.

The ransomware mitigation engine described herein may also include a kernel mode or user mode file system filter driver. This may be file system specific. The file system filter driver provides synchronous notifications of whether a file is written, deleted, renamed, closed, or newly created by a process in the system. It may also be used to track the identity of the process performing the file I/O operation. The driver can further monitor creation and termination of processes. This is useful in not only determining that a file may have been compromised, but also in determining which process compromised the file, so that it can be identified as ransomware or malware, as appropriate.

Embodiments also include an in-memory metadata lookup cache, which may be relatively small. This can maintain mapping between the file full path, the process name, and a process identifier (PID). The in-memory metadata lookup cache can also maintain lifecycle events for a file by a process. For example, new-> write-> rename-> delete, by a common process with a common PID.

The file filter module described above may be configured to hook file write, new file creation, file delete, file rename, file close (cleanup), and process terminate operations. It may also expose APIs that create a file backup. In some examples, this is a transitory backup that is maintained only while the file event is being processed. The backup engine can use operating system provided kernel mode APIs. When the file operation is complete, and when the ransomware mitigation engine has determined that the file has not been compromised, the transitory backup can be removed. Note that the designation of this backup as transitory is an illustrative example only, and refers to the temporary nature of the file. This is not to imply that the backup file cannot be stored on a non-transitory, computer-readable storage medium such as a hard drive, a solid-state drive, a static random access memory (RAM), or other non-transitory medium. Rather, this simply indicates that when the file operation has been verified, it is no longer necessary to maintain the transitory backup file.

When a process attempts to write, delete, rename, create, or otherwise manipulate a file on the system, the file filter module may intercept the file I/O and a synchronous pre-operation event may be raised. This can include metadata information like process name, PID, full file path, etc. The system creates an entry about this file in its metadata cache, and may create a transitory backup of the file, as well. The transitory backup may be particularly important in the case of file write or delete events. The file filter module may then subscribe to file close (cleanup) notifications, and then let the file I/O operation continue to completion.

Once the system receives the file close (cleanup) notification, it may look in the metadata cache and check the last event on this file. If the last event was either a write or a new file, the system may perform a file format integrity analysis or run the file through an FTI layer. This can include reading the entire file content, or portions of the file, as required by the FTI neural network format classification engine. The FTI layer may predict or classify the file format with some percentage of confidence in the classification. If the format classification is a known format with a strong percentage confidence, the system does not need to take any further action, and may delete the transitory backup file for this event.

On the other hand, if the FTI layer predicts a known format with a weak confidence, or if it classifies the file format as unknown or encrypted—especially with high confidence—then the file I/O operation may be treated as suspicious. In the case of a suspicious file I/O operation, the system passes this information, along with file event metadata, to the heuristic layer. Thus, the FTI layer acts as a front end filter for filtering out file I/O when the file format is known and intact. Only suspicious, unknown, encrypted, or tampered with file formats are passed for further processing to the heuristic engine. This front end filtering by the FTI layer improves system performance and reduces overall false positives, as it filters out known compressed file formats, multimedia files, and similar, which may otherwise closely resemble encrypted files. The FTI layer only passes files that are unknown or that are classified with weak confidence, or that are classified as encrypted or suspicious.

The heuristic layer may receive from the FTI layer an indication that a file has an unknown file content, a weak confidence classification, or has been classified as encrypted or compromised. In that case, the heuristic layer may read either the entire file or multiple portions of the file, depending on the system configuration. It may then extract various mathematical features that can describe distribution of bytes in the file content.

By way of example, the heuristic layer may extract the following mathematical attributes by reading the content.

Entropy: This describes how random the byte distribution is given the file content. The closer this value is to approximately 7.8 or higher, the higher the indication that the file isn't encrypted or obfuscated.

Monte Carlo Pi: The closer this value is to the true value of Pi (approximately 3.14159), the greater the indication that the file is encrypted or too random.

Monte Carlo Pi Error: This is a percentage approximation of the Monte Carlo pi value. The closer this is to 0.01 (or less), the lower the error in the Monte Carlo pi value approximation. This also indicates a high degree of randomness, which indicates that a file may be encrypted.

Serial Correlation Coefficient: This is an indication of how correlated the byte distribution is, or if most of the bytes are unique in a given data collection. A low value indicates a highly uncorrelated data content. If the value is approximately 0.001 or less, it indicates a highly random or encrypted file.

Arithmetic Mean: This is the mean distribution of bytes in the given content. If the value is close to or around approximately 127, this indicates that the file is highly random and may be encrypted.

Chi Square Distribution: If this value is greater than a threshold (usually in the range of 255 to 300) with a lower value of Pi error, this is an indication that the file may be encrypted.

The heuristic layer combines these attributes, or looks for a combination of these attributes, in comparison to expected values. For example, if a file is supposed to be encrypted, it may be expected to have a very high randomness. But a plain text file exhibits strong usage patterns, and is thus expected to have low randomness. Thus, if an alleged text file has a high degree of randomness (i.e., there is a strong mismatch between the expected values for the text file and the computed values in the use case), then it is a strong indication that this is an unknown classified file format, a weakly classified file format, or an encrypted file. Recall that the FTI previously analyzed this file and marked it as potentially suspicious, or in other words, the file previously passed through the FTI's first order filter. When the heuristic layer determines that the file has, for example, high randomness, the FTI's 'suspicion' that the file might be encrypted is strongly confirmed.

When the heuristic layer classifies or predicts the byte distribution as close to that of an encrypted file, this may be treated as a 'detection event.' Upon a detection event, the system may mark the process that initiated the file I/O operation as suspicious, itself. The system may then kill the process that created the new encrypted file. For example, the system may query the metadata cache for the process and PID to identify the offending process. The system may also restore the impacted file or files from its transitory backup, as well as undoing any file rename operations.

Because the ransomware mitigation engine also subscribes to the process terminate event, it undoes all file deletes by restoring from file backups. On the other hand, if the process terminates without detecting a ransomware event, then any transitory backup files created for this process or file I/O operation may be deleted.

If the heuristic layer classifies or predicts that the byte distribution is normal, then the system may allow the file I/O operation and permit the process to continue executing. It may also delete the transitory backup files. In the case of a successful classification (i.e., the process is classified as non-ransomware), the system may collect telemetry such as file size, file extension, and mathematical attributes computed by the heuristic layer, to improve the neural network and to reduce the number of false positives at the FTI classification layer.

A system and method for detecting ransomware will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ('widget 10'), while individual species or examples of the genus may be referred to by a hyphenated numeral ('first specific widget 10-1' and 'second specific widget 10-2').

FIG. 1 is a block diagram of a home network 100, according to the teachings of the present specification. Embodiments of home network 100 may be adapted or configured to provide the method of detecting ransomware disclosed herein.

In the example of FIG. 1, home network 100 may be a 'smart home' with various Internet of things (IoT) devices that provide home automation or other services. Home network 100 is provided herein as an illustrative and nonlimiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 100, one or more users 120 operate one or more client devices 110. A single user 120 and single client device 110 are illustrated here for simplicity, but a home or enterprise may have multiple users, each of which may have multiple devices.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions running on client devices 110.

In this illustration, home network 170 is shown as a single network for simplicity, but in some embodiments, home network 170 may include any number of networks, such as one or more intranets connected to the Internet. Home network 170 may also provide access to an external network, such as the Internet, via external network 172. External network 172 may similarly be any suitable type of network.

Home network 170 may connect to the Internet via a home gateway 108, which may be responsible, among other things, for providing a logical boundary between home network 172 and external network 170. Home network 170 may also provide services such as dynamic host configuration protocol (DHCP), gateway services, router services, and switching services, and may act as a security portal across home boundary 104.

Home network 100 may also include a number of discrete IoT devices, which in contemporary practice are increasing regularly. For example, home network 100 may include IoT functionality to control lighting 132, thermostats or other environmental controls 134, a home security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Home network 100 may communicate across home boundary 104 with external network 172. Home boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 100, such as security software, security updates, network appliances, or similar. For example, McAfee, Inc. provides a comprehensive suite of security services that may be used to protect home network 100.

It may be a goal of users 120 and home network 100 to successfully operate client devices 110 and IoT devices without interference from attacker 180 or from unwanted security objects. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

In one embodiment of the present disclosure, ransomware object 182 may be either a known or an unknown ransomware object (e.g., a 'zero-day' exploit). Attacker 180 may attempt to insert a ransomware object into 182 to compromise data from home network 170, including data that may be stored or gathered by client device 110, lighting 132, thermostat 134, home security 136, and other devices 140.

In some embodiments, ransomware object 182 may attempt to compromise data stored in storage 150 within client device 110. This could include, for example, accessing data at rest within storage 150, and encrypting the data with a key known only to attacker 180. Ransomware object 182 may employ various anti-detection techniques, such as waiting for client device 110 to enter an idle state, and performing only limited file operations on storage 150 at a time. This can help avoid detection of ransomware object 182 by client application 112. Furthermore, ransomware object 182 may not yet have a classification or a fingerprint with security services provider 190. Client app 112 may also be prevented from successfully detecting ransomware object 182 because ransomware object 182 may not internally carry common strings for providing a 'ransom note.' Rather, ransomware object 182 may complete executing its payload and encrypting files, and may then query a C2 server operated by attacker 180 to retrieve the text for the ransom note. Ransomware object 182 may then display the ransom note to user 120 via client device 110. If user 120 has not maintained separate offline backups of data from storage 150, then user 120 may be in the difficult position of deciding whether regaining access to his files is worth paying attacker 180.

Note that client device 110 may be configured to provide incremental backups to a cloud storage provider 194. Such backups are often in the nature of incremental backups, where files that have recently been changed are backed up, and are generally based on file name. So if ransomware object 182 encrypts a file on storage 150 without changing its file name and extension, then that encrypted file may be backed up to cloud storage provider 194 in the next incremental backup. Even in cases where cloud storage provider 194 provides versioning of files, it can be prohibitively difficult to go back and find the last good version of every file that was backed up to cloud storage provider 194.

Client app 112 may be an embodiment of a ransomware remediation engine, or of selected elements of a ransomware remediation engine as described in this specification. Security services provider 190 may also provide certain aspects or elements of a ransomware remediation engine, including server-side functions which may be hosted on dedicated servers or in a data center.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ('malware') includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 100 may contract with or subscribe to a security services provider 190, which may provide security services, updates, antivirus definitions, patches, products, and services. McAfee®, Inc. is a nonlimiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 2:
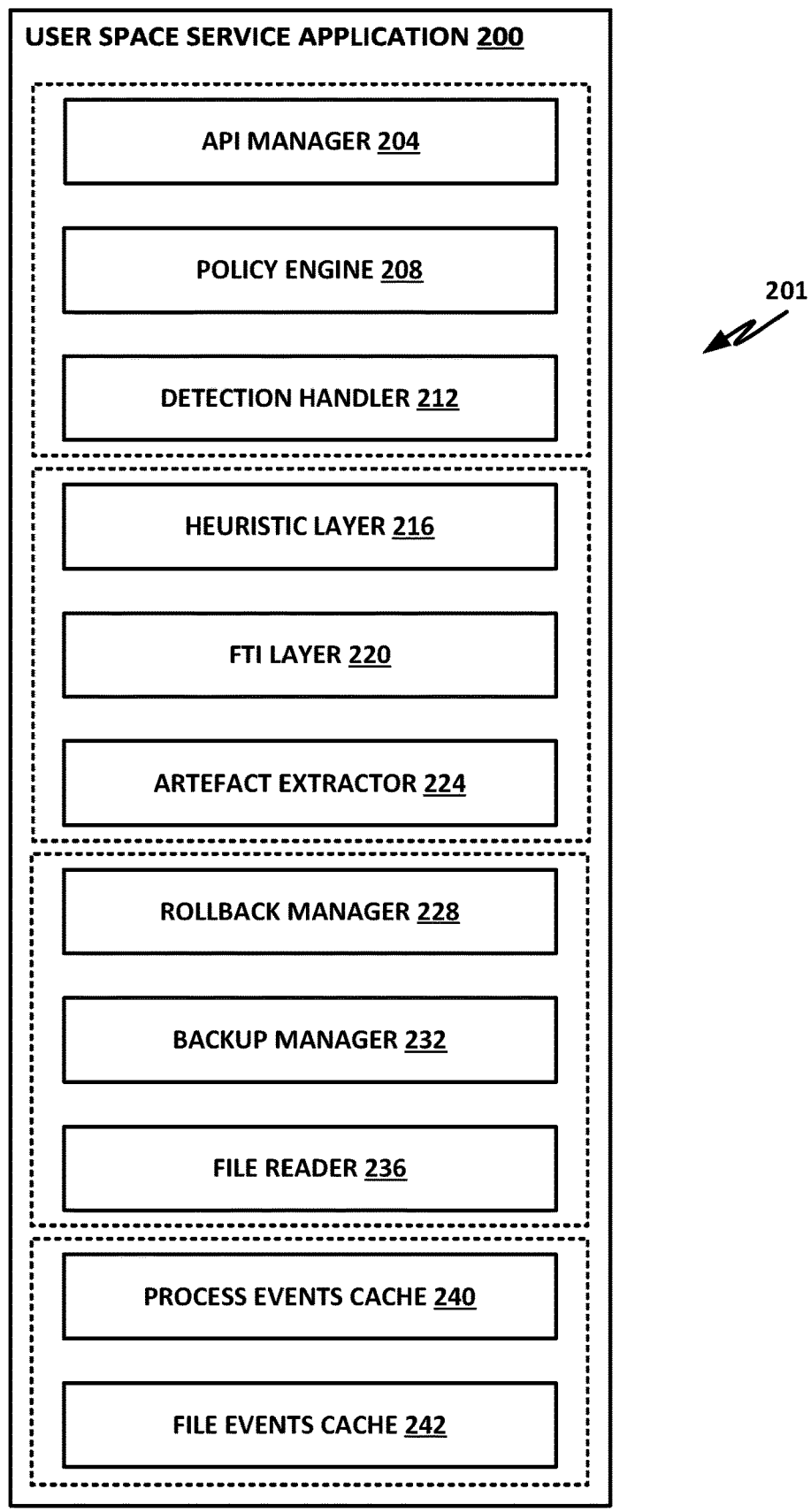
FIG. 2 is a block diagram of selected elements of a ransomware remediation engine, according to the teachings of the present specification.

FIG. 2 is a block diagram of selected elements of a ransomware mitigation engine 201, according to the teachings of the present specification. Specifically, ransomware mitigation engine 201 includes elements provided in a user space service application 200. It should be noted, however, that although these elements are shown in 'user space,' this is not intended to imply that all of these elements must reside on a client machine such as client machine 110 of FIG. 1. Rather, some of the elements shown in user space service application 200 may be located on a server. The division of elements between a local user space application on the client machine and a server device will depend on the design requirements of a particular embodiment. For example, in one embodiment, file events cache 242, process events cache 240, file reader 236, backup manager 232, and rollback manager 228 may all be provided on the local client machine. Artefact extractor 224, FTI layer 220, heuristic layer 216, detection handler 212, policy engine 208, and API manager 204 may be located on the server.

However, this should not be understood to imply that the elements disclosed herein must be divided at some arbitrary horizontal line between elements. For example, detection handler 212 and API manager 204 could both be provided on the local machine, while policy engine 208 could be provided on a server.

In general, FTI layer 220 and heuristic layer 216 are the most compute intensive layers or modules provided in the engine, and are therefore the most likely to be provided on an external server, where a machine with higher compute resources can be provided. For example, heuristic layer 216 and FTI layer 220 could be provided in a data center, where certain hardware accelerators may be provided for performing CNN and heuristic functions. CNNs are often provided on massively parallel graphics processing units (GPU), which are provisioned separately from the CPU compute resources of a data center. It is uncommon for a user-class client device to have the available compute resources for providing a CNN, although it is not unheard of. In particular, many so-called 'gaming rigs' have one or more very high-end graphics cards that can provide the massively parallel computations of a CNN.

Similarly, heuristic layer 216 could be provided on a server, which may perform the heuristic computations on a processor (in software). Alternatively, heuristic layer 216 could be provided in a hardware accelerator, which could be provisioned on an application-specific integrated circuits (ASIC), a field-programmable gate array (FPGA), or a co-processor configured to provide the function. In some embodiments, heuristic layer 216 may be a mathematical formula or a very small model, which may be trained and serialized on the client. In some embodiments, heuristic layer 216 runs fully on the client side. Heuristic layer 216 could be a short mathematical formula to calculate, for example, entropy>7.9 and SCC=0, MCPIE=0, MCPI~3.14, or similar. Alternately, it could also be a small machine learning model (a comparatively simple or machine learning algorithm) which can determine whether the byte distribution is random or not. By using a small model, execution can occur more quickly.

In general terms, ransomware mitigation engine 201 may encompass any combination of hardware, software, firmware, accelerators, and other compute resources that together are configured to provide the methods disclosed herein. These could include, by way of illustrative and nonlimiting example, a processor, a co-processor, a hardware accelerator, an FPGA, an ASIC, a GPU, and/or one or more tangible, non-transitory computer-readable storage mediums having stored thereon instructions to instruct a processor or other programmable device to carry out a method, or to instruct a device to configure hardware (such as an ASIC or FPGA) to provide the method.

In this illustrative embodiment, ransomware mitigation engine 201 includes user space service application 200. User space service application 200 includes caching elements such as file events cache 242 and process events cache 240. File events cache 242 may be a local cache of file events such as open, read, write, delete, close, or other file operations. These may be of interest to user space service application 200 as described throughout this specification, e.g., to detect that a process has written to or has accessed a file, and therefore may require ransomware mitigation.

Process events cache 240 may include cached elements such as a process ID (PID) or other metadata for identifying a process that performs the file operations of file events cache 242. These data may be necessary, for example, when ransomware mitigation engine 201 detects a suspicious operation and wants to flag the process that performed the operation as suspicious. Such data may also be necessary to terminate, sandbox, or otherwise remediate the suspicious process. In some cases, a copy of the process or a fingerprint (e.g., hash) of the process may be uploaded to a server such as an enterprise security server or to a security services provider. This may help to detect future instances of the same suspicious process.

File reader 236 can be configured to read a copy of possibly affected files when a potentially malicious operation takes place. This can include, for example, operating backup manager 232 to create a local (or remote) transitory backup of the file currently being operated on. This captures the file in its previous good state, and ensures that there is a good copy of the file in the case that a ransomware process encrypts the file, or otherwise attempts to deny the user access to the file.

Rollback manager 228 can receive data or signals indicative that a file has been tampered with, and that a rollback is necessary. When rollback manager 228 receives such an indication, it may overwrite the newest version of the file (i.e., the version identified as having been tampered with) and rolls that back to the transitory backup created by backup manager 232.

Artefact extractor 224 extracts artefacts from files and processes. The artefacts may be used to train the neural network model, and may also provide inputs to instances of the model. The use of artefacts ensures that FTI layer 220 does not need to receive an entire file to perform its analysis. Rather, a percentage of the file may be read, such as a certain portion from the beginning of the file, a certain portion from the end of the file, and randomly selected chunks of data from the middle of the file. Artefact extractor 224 may also extract artefacts such as metadata or attributes from the file. Artefacts may include, by way of illustrative and nonlimiting example:

1. File attributes (length, extension, header, type, creation time, modification time, and so forth).
2. Process attributes such as process name and hash.
3. Mathematical attributes, such as entropy, Modified Chebyshev-Picard Iteration (MCPI), MCPI Efficiency (MCPIE), SCC, or others.

Note that the foregoing are merely examples of artefacts that may be extracted, and many other features may be extracted from a file for analysis.

FTI layer 220 provides a 'first-pass' filter of file operations. In one embodiment, FTI layer 220 may be a lightweight or simplified neural network that can run on a user-class machine to perform a first-pass analysis of a file operation. As discussed more extensively throughout this specification, FTI layer 220 may predict a known file format with a percent confidence. This may be performed, for example, in an FTI or content classification layer that provides a CNN. The FTI layer attempts to match the file under analysis with previously known 'good' examples of this type of file. For example, if the file purports to be a text file, then FTI layer 220 may analyze the text file in relation to other text files that the CNN was previously trained on. If it determines with a high degree of confidence (i.e., a high percentage) that the file under analysis is in fact an unencrypted text file as it claims to be, then FTI layer 220 does not 'pass' the file. Rather, the file operation is deemed good, and is permitted to complete. On the other hand, if FTI layer 220 provides only a weak classification for the file, or strongly classifies the file as encrypted or not matching its purported file type, then it passes the file to heuristic layer 216.

Heuristic layer 216 performs, for example, a statistical analysis on the file to determine mathematical attributes of the file content. This may include, for example, computing entropy, computing a Monte Carlo pi, Monte Carlo pi error, serial correlation coefficient, arithmetic mean, chi square distribution, or other mathematical properties. If one of these does not match the expected value, then the file may be deemed suspicious. If two or more of these do not match the expected value, then the confidence that the file is suspicious increases.

Detection handler 212 is a lower resource-consuming engine that could usefully be located either on the client side or on the server side of a network connection. Detection engine 212 may be specifically responsible for handling the output of heuristic layer 216, and determining whether the output represents a detected ransomware event. For example, if heuristic layer 216 detects with a sufficiently high confidence that a file that should not be encrypted has been encrypted, or is unable to detect with sufficiently high confidence that a file that should not be encrypted has not been encrypted, then detection layer 212 may flag the event as a detection. The detected event, such as a ransomware event, can then be provided to policy engine 208.

Like detection engine 212, policy engine 208 may be sufficiently low in resource usage that it may be located on either the server side or on the client side. Furthermore, in some cases, policy engine 208 may span different devices. For example, in an enterprise, it may be desirable to maintain policy engine 208 strictly on a server machine, so that a single policy can be defined for the entire enterprise. But in the case of a consumer, the security services provider may provide an overall policy with certain user configurable options, which the user can then store locally on the client machine.

Policy engine 208 determines which action or actions to take in response to a detected ransomware event. These could include, for example, restoring the affected file from a transitory or other backup, terminating, isolating, sandboxing, or otherwise remediating the process that operated on the file, fingerprinting the allegedly offending process, or instituting a deep static analysis of the process, which could take place either on the local machine or on a server.

API manager 204 provides an application programming interface that enables applications to communicate with user space service application 200. This can include, for example, a graphical user interface (GUI) or other user interface that enables a user to configure user space service application 200. In another example, API manager 204 could provide an API such as a representational state transfer (REST) API, which can be used to provide remote administration or configuration of user space service application 200. Other APIs may also be provided.

Figure 3:
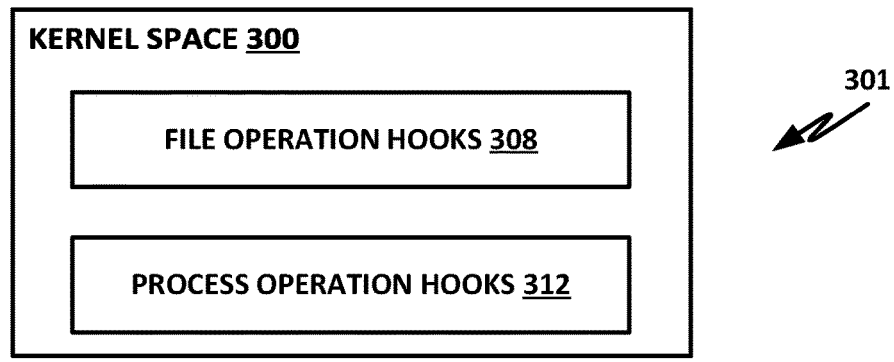
FIG. 3 is a block diagram of a kernel space of a ransomware remediation engine, according to the teachings of the present specification.

FIG. 3 is a block diagram of kernel space 300 of a ransomware remediation engine 301, according to the teachings of the present specification. Ransomware remediation engine 301 may be a part of ransomware mitigation engine 201 of FIG. 2, or may be in part or in whole a separate ransomware remediation engine.

Ransomware remediation engine 301 specifically illustrates certain kernel space operations 300, which include a kernel space file system I/O filter. The kernel space I/O filter can include both file operation hooks 308 and process operation hooks 312.

File operation hooks 308 provide a notification and/or interception of attempted file I/O operations on the file system. This can enable ransomware remediation engine 301 to determine that a process identified by process operation hooks 312 is attempting to perform the file operation identified by file operation hooks 308. Process operation hooks 312 and file operation hooks 308 together provide the notifications relied on by certain embodiments of the ransomware remediation engine described herein.

Figure 4A:
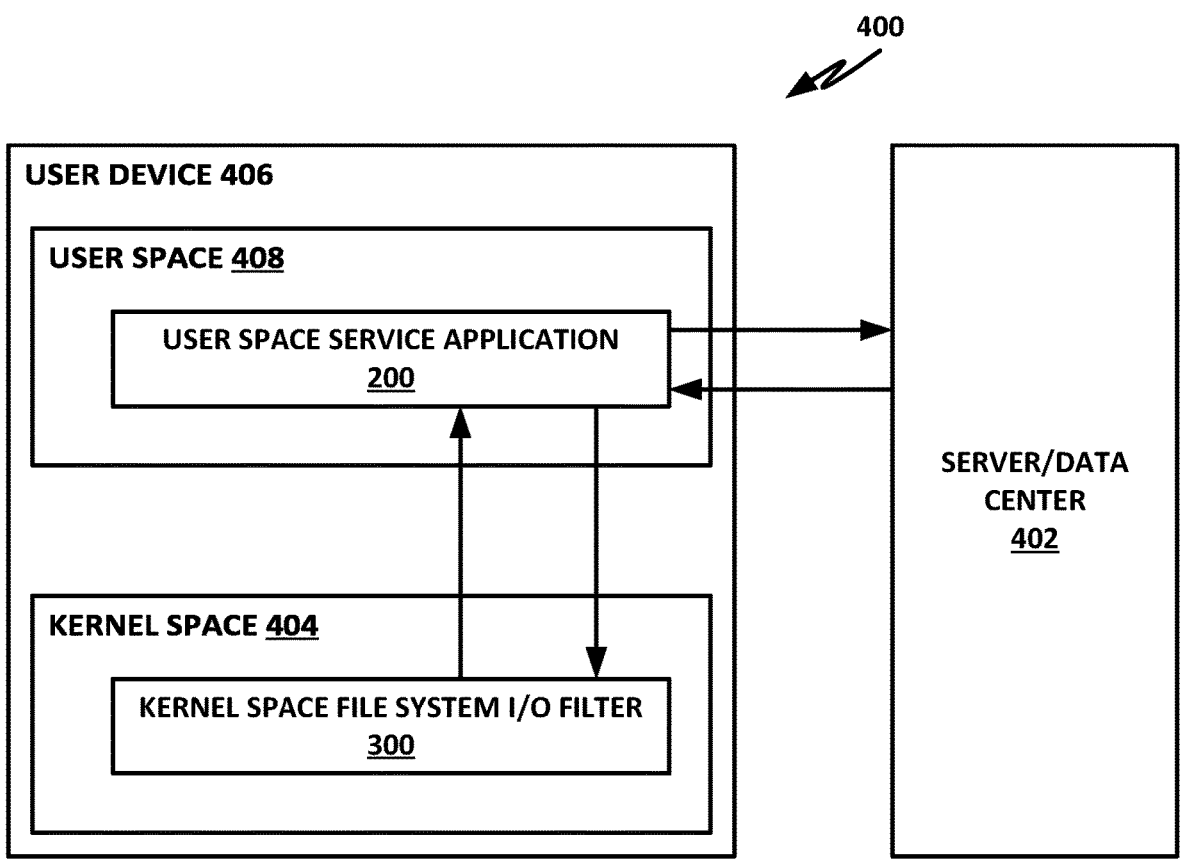
FIG. 4a is a block diagram illustrating aspects of a ransomware remediation engine, particularly the separation of certain elements, according to the teachings of the present specification.

FIG. 4a is a block diagram illustrating aspects of a ransomware remediation engine 400, particularly the separation of certain elements, according to the teachings of the present specification.

In the example of FIG. 4, there is a user device 406 and a server/data center 402. User device 406 may be, for example, a client machine, an end user machine, a consumer machine, or other device that is to be protected by ransomware remediation engine 400. User device 406 includes user space 408 and kernel space 404. In this example, user device 406 is communicatively coupled, such as via a network or other data connection, to server/data center 402.

As discussed above, certain elements of ransomware remediation engine 400 may be located on user device 406, including within user space 408 and within kernel space 404, while other aspects of ransomware remediation engine 400 may be located in server/data center 402. The selection of which elements are to be included on user device 406 and which are to be included in server/data center 402 may be driven by design considerations of a particular deployment. For example, in a deployment where processing or compute power on user device 406 is at a premium, it may be desirable to offload as much as possible to server/data center 402. This may particularly be the case in mobile tablets or phones, or other smaller devices with relatively limited compute capacity. In that case, it may be desirable to offload compute intensive operations to server/data center 402.

On the other hand, in cases where user device 406 is a highly capable device, and particularly if user device 406 has the ability to locally host a complete convolutional neural network, then it may be desirable to completely locate ransomware remediation engine 400 on user device 406.

In most deployments, there will be some logical division between user device 406 and server/data center 402. In addition to the compute power, another consideration may be the available bandwidth between the two devices. For example, in cases of high bandwidth (especially in an enterprise where the enterprise 'owns' all of the data) it may be desirable to locate more functionality on server/data center 402. In particular, any time that a possibly suspicious file operation occurs, the file may be uploaded to server/data center 402 and analyzed there.

In other cases, such as in a consumer class deployment, it is more desirable to host data on user device 406, because the user may be concerned about data privacy. For data and files to be uploaded to server/data center 402, it may in some cases be necessary to strip those files of personally identifying or otherwise personal information, or to further ensure that the security services provider operating server/data center 402 is not able to simply access everybody's data. Furthermore, it may not be practical to upload every file for analysis, particularly in the case of large files, which can severely strain network bandwidth. Thus, in some cases, local processing may be performed on user device 406 to reduce the file being analyzed to an anonymized state, such as via hashing, processing, or reduction to certain frequency characteristics. These frequency characteristics can then be uploaded as metadata to server/data center 402, where they can be processed and compared within the FTI in a CNN. A heuristic layer within server/data center 402 may then process the file to determine whether a ransomware attack has taken place, and may then provide instructions to user space service application 200 of user space 408, to instruct user space service application 200 to take remedial action.

Figure 4B:
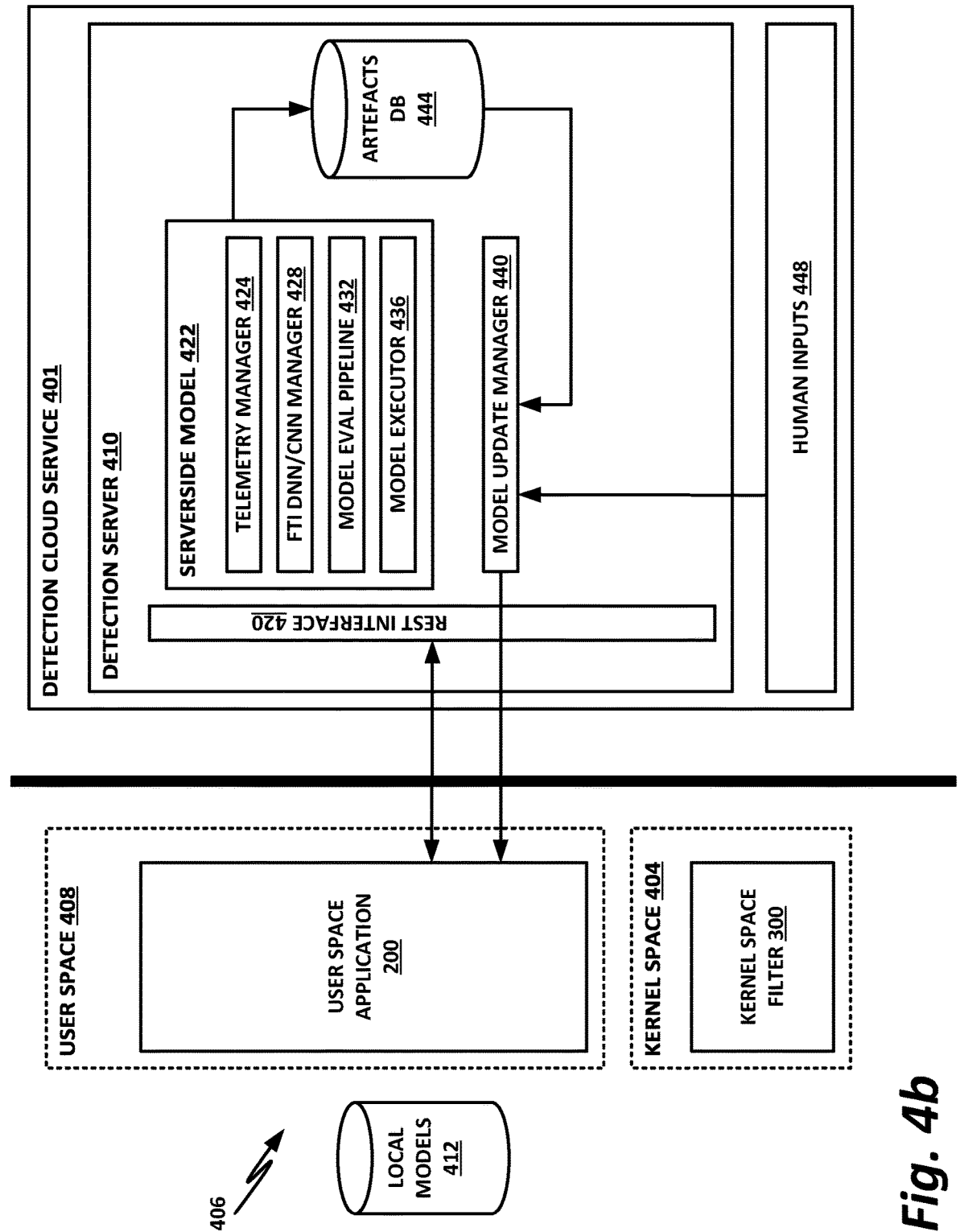
FIG. 4b is an illustration of an embodiment in which a detection server is operated as part of a detection cloud service.

FIG. 4b is an illustration of an embodiment in which a detection server 410 is operated as part of a detection cloud service 401. Detection cloud service 401 includes the detection server 410 as well as human inputs 448. Human inputs 448 can include searches, monitors, human collected telemetry, human driven updates, human analysis of client data, and human created or modified cloud models.

In this embodiment, a division is shown between user device 406 and detection server 410. By way of illustration, user device 406 includes all of the elements of a user space service application such as user space service application 200 of FIG. 2, as well as kernel space 300 of FIG. 3. In particular, FTI layer 220 of user space service application 200 may be a lightweight neural network with relatively limited processing capabilities. If FTI layer 220 is able to determine with sufficient confidence that the file has not been compromised, then no further action may be necessary. But if FTI layer 220 is not able to determine with sufficient confidence that the file has not been compromised, then it may enlist aid from detection cloud service 401, by communicating with detection server 410 via rest interface 420. For example, user space service application 200 may operate artefact extractor 224 to extract artefacts in relevant portions of the file under analysis, and provide the data to detection server 410 via rest interface 420. Detection server 410 may then operate server-side model 422 to provide deeper analysis of the file under analysis.

Server-side model 422 includes telemetry manager 424, FTI deep neural network (DNN)/convolutional neural network (CNN) manager 428, model evaluation pipeline 432, and model executor 436. Server-side model 422 has access to an artefacts database 444, which may include artefacts and related data collected from many different client machines. This helps to better characterize the file according to its artefacts.

Telemetry manager 424 provides the collected artefacts to artefacts database 444.

Figure 8:
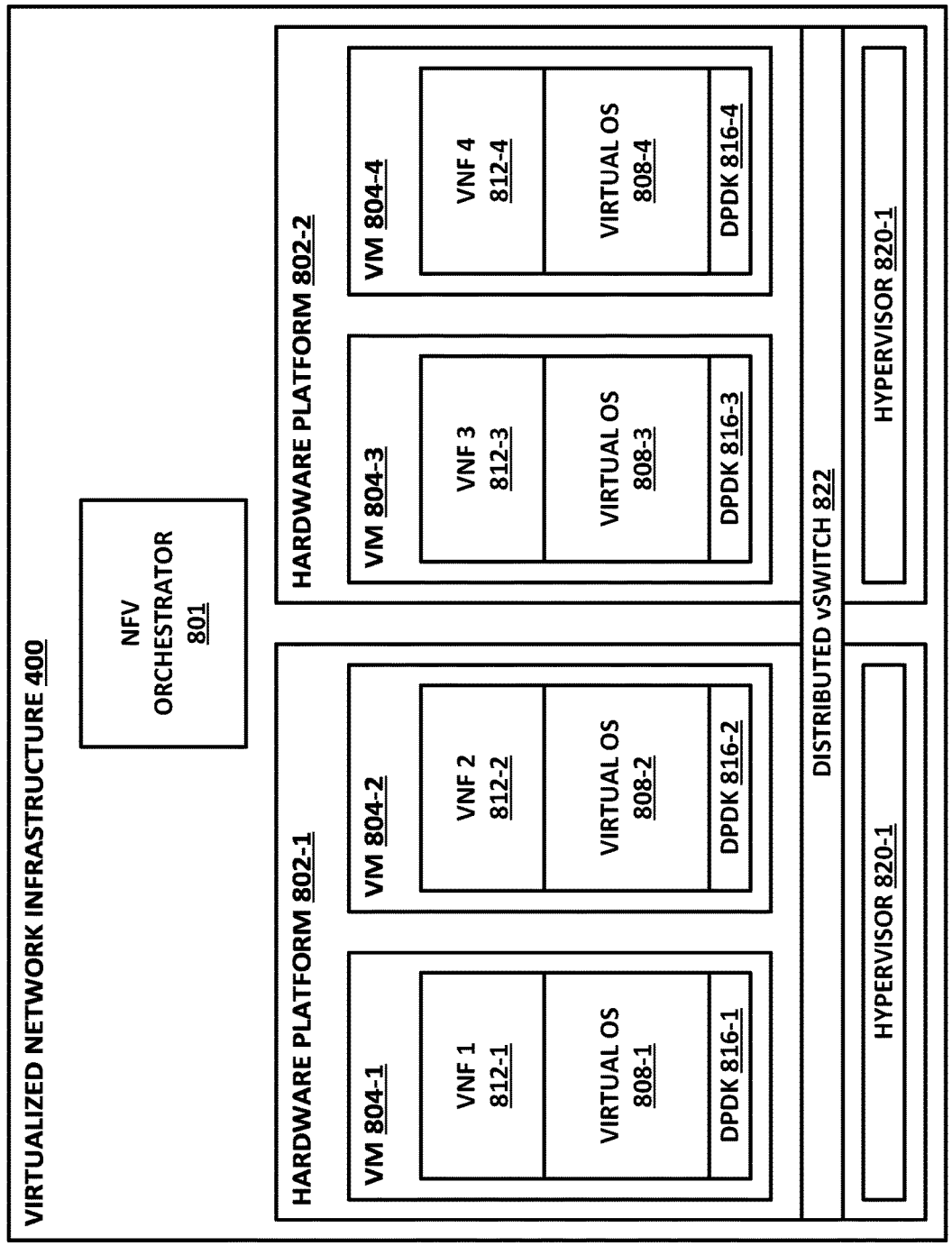
FIG. 8 is a block diagram of a network function virtualization (NFV) architecture, according to the teachings of the present specification.

FTI manager 428 may provide a CNN, a DNN, or a deep convolutional neural network (DCNN), by way of illustrative and nonlimiting example. FTI manager 428 provisions the neural network, which in some cases may include provisioning hardware accelerator resources in a data center or in an enterprise server environment. For example, a DNN/CNN or DCNN accelerator could be instantiated on a group of GPUs, which are provided as accelerator resources in a data center. When a node requires use of the accelerators, then the accelerators are provisioned to that node. Note that in this case, detection server 410 may not be a physical server, but may in fact be a virtual machine as illustrated in FIG. 8. In that case, resources can be dynamically allocated to the virtual machine to carry out its functions.

In this case, the DNN/CNN is divided into two parts, namely a server side and a client side. User device 406 has a very trimmed-down version of the DNN/CNN that is used on the client side. If the verdict from the trimmed-down version of the DNN/CNN on user device 406 does not yield a sufficient confidence, then the data are sent to run on a larger and more capable DNN/CNN on detection server 410.

If the output of the entire DNN/CNN is still unknown or weak in confidence (e.g., less than approximately 85%), then the file is passed to heuristic layer 216 to analyze the byte distribution and determine how random the byte distribution is, for example. The randomness of the byte distribution can be used to determine whether a file is unknown or encrypted.

Model evaluation pipeline 432 is a pipeline that pipelines the model, and model executor 436 executes the model.

Detection cloud service 401 also includes a model update manager 440, which can be used to update the FTI and/or the heuristic models according to human inputs, artefacts and attributes from artefacts database 444, and training of the neural networks, by way of nonlimiting example. Model update manager 440 can provide updates to the FTI models of both user device 406 and detection server 410, and can therefore keep the models up to date.

Figure 5A:
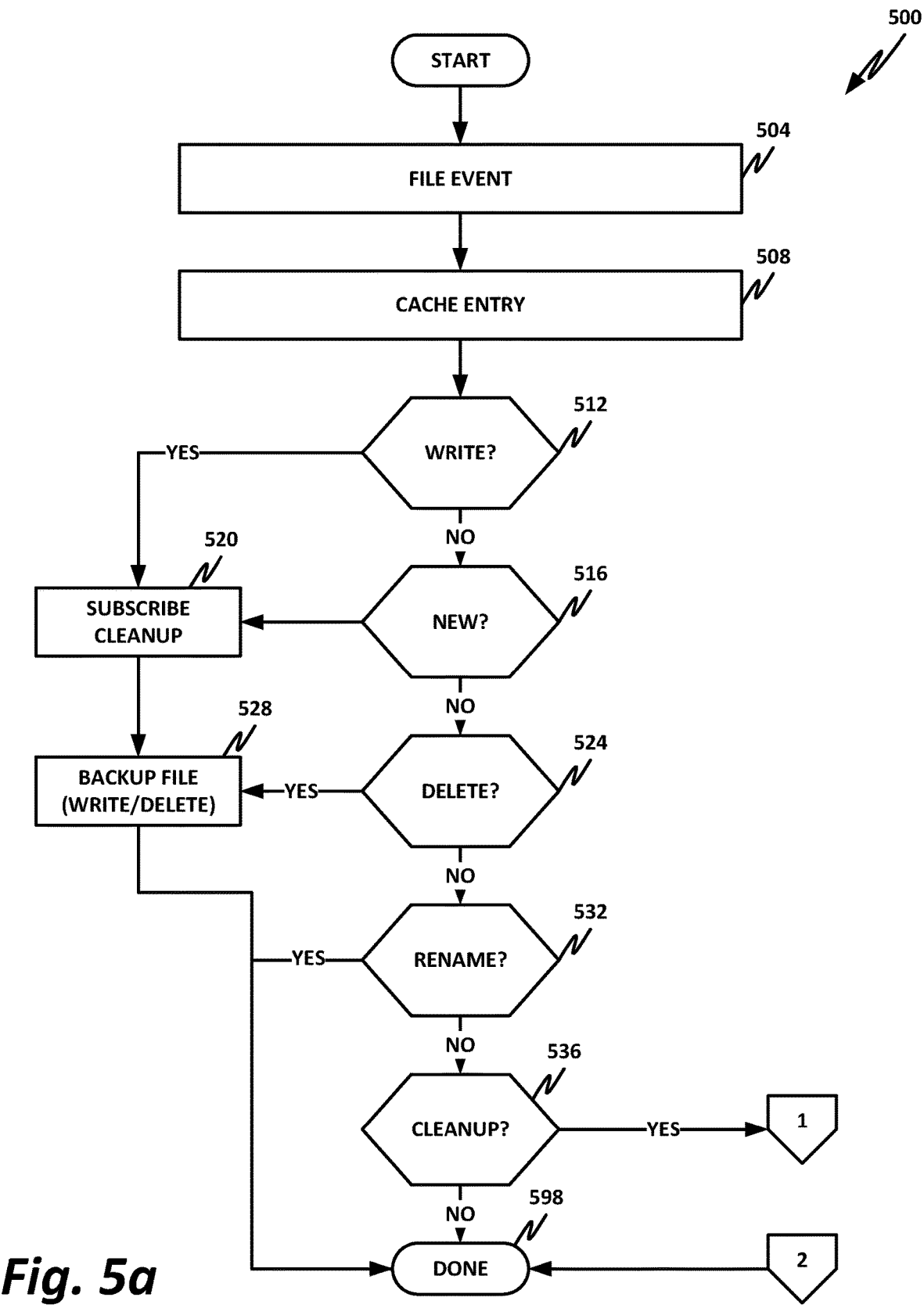
FIGS. 5a and 5b are a flowchart of a method of performing file analysis, according to the teachings of the present specification.
Figure 5B:
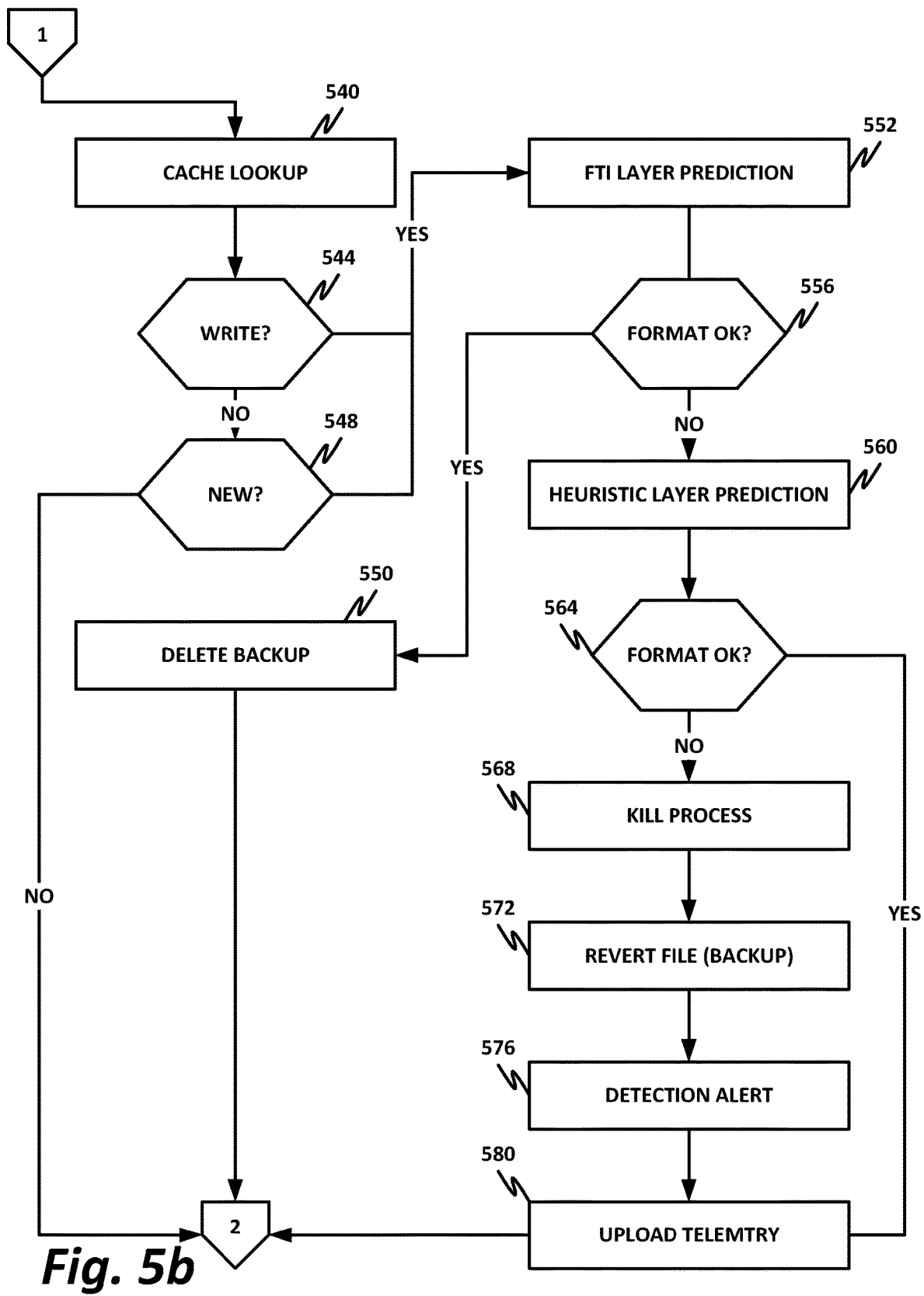

FIGS. 5a and 5b are a flowchart of a method 500 of performing file analysis, according to the teachings of the present specification. Note that method 500 is illustrated as a single monolithic or unitary method that performs the full ransomware remediation method disclosed herein. As discussed in previous FIGURES, certain parts of method 500 may be performed locally, while other parts may be performed remotely, on any remote or local device as appropriate to the embodiment.

In block 504, a file event occurs. The file event could be, by way of illustrative and nonlimiting example, a file open, read, write, flush, delete, or new file creation.

In block 508, the file operation is locally cached in a cache entry. The ransomware remediation engine may then determine the type of file and whether further analysis should occur.

In decision block 512, the system checks whether the file operation is a file write. If the file operation is not a file write, then in decision block 516, the system checks whether a new file has been created.

If a new file has not been created, then in decision block 524, the system checks whether the file has been deleted.

If not, then in decision block 532, the system checks whether the file has been renamed. If the file has not been renamed, then in decision block 536, the system checks whether there is a file cleanup event (i.e., a file close).

If none of blocks 512, 516, 524, 532, or 536 are true, then in block 598, the method is done. Notably, blocks 512, 516, 524, 532, and 536 represent cases where a file has been changed, where there is an opportunity to tamper with the file. If the file has not been changed (e.g., a pure file read), then no special remedial action need be taken, because the file remains unchanged.

Returning to decision blocks 512 and 516, if this is either a file write or a new file, then the system subscribes to cleanup events for this file. In other words, when a cleanup occurs and the write is committed to disk, the ransomware remediation engine should be notified so that it can determine whether the newly written or created file has been tampered with, such as by encrypting the contents.

Returning to decision block 524, if a file delete event is occurring, then in block 528, a backup file is created to protect against write and delete events. Note that block 528 is also reached after the system subscribes to cleanup in block 520. Thus, the backup file, which may optionally be a transitory backup, protects against write and delete events.

Returning to decision block 532, if this is a rename operation, then no further action need be taken, and in block 598, the method is done.

Returning to decision block 536, if a file cleanup operation occurs, then the system may have subscribed to this operation, and it may need to take remedial action, or decide whether to take remedial action.

Following off-page connector 1 to FIG. 5b, in block 540, the system performs a cache lookup to find the latest file operation taken.

In decision block 544, the system checks whether the last taken operation was a write, and in decision block 548, it checks whether a new file was created. If neither one of these has occurred, then following off-page connector 2 back to FIG. 5*a*, in block 598, the method is done.

Returning to blocks 544 and 548, if either a write or a new file operation has occurred, then the file may need to be further analyzed to determine whether remedial action is necessary. Please note that while blocks 544 and 548 may appear to be redundant to blocks 512 and 516, they are not necessarily so, because they may take place in different operating spaces. For example, blocks 512 and 516 may take place within the kernel, or on a local machine, while blocks 544 and 548 may take place on a remote machine, or outside of the kernel space.

Proceeding from either block 544 or 548, in block 522, the system performs the FTI layer prediction. The FTI layer prediction can include analysis in a convolutional neural network as described above. This provides a first order filter that identifies a file that might potentially be suspicious. FTI layer prediction 552 may not be required to make a final determination as to whether a ransomware attack has occurred, but rather, computes with a given confidence that a file has not been compromised. If FTI layer prediction 552 determines in block 556 that the file format is okay, then in block 550, the backup may be deleted. This means that FTI layer prediction 552 predicted with sufficiently high confidence that the file was not compromised, and therefore the transitory backup is not required. Following off-page connector 2 back to FIG. 5*a*, in block 598, the method is done.

Returning to block 556, if FTI layer prediction 552 was not able to determine with sufficient confidence that the file format is okay, then in block 560, the file is subjected to heuristic layer prediction 560. This provides a statistical analysis, which may include, for example, an entropy calculation, a Monte Carlo pi, a Monte Carlo pi error, a serial correlation coefficient, an arithmetic mean, or a chi square distribution, by way of illustrative and nonlimiting example.

In decision block 564, a detection handler such as detection handler 212 determines whether the file format is okay. This may include, for example, determining whether the file failed one or more of the statistical checks. While failure of one statistical check may be somewhat indicative that the file has been compromised, failure of two or more of the statistical checks may be strongly indicative that the file has been compromised. The policy engine may include logic for determining how aggressively to treat a given situation, or what percentage confidence is required before a file is reverted.

If in block 564 it is determined that the file is okay and thus has not been compromised, then in block 580, the system may upload telemetry. The telemetry data can be used to further train the convolutional neural network of FTI layer 552. Following off-page connector 2 to FIG. 5*a*, in block 598, the method is done.

Returning to decision block 564, if the system determines that the file format is not okay according to policy (i.e., has not withstood sufficient statistical confidence), then in block 568, the system may kill the offending process. This may help to prevent additional damage to the system.

In block 572, the system may revert the affected file from the backup, such as a transitory or a non-transitory backup, to set the file to its previous state.

In block 576, a detection alert may be raised. This may include, for example, notifying the end user, notifying a system or security administrator, notifying an enterprise security server, notifying a security services provider, or performing some other alert action.

In block 580, telemetry from the compromised file may be uploaded, such as to FTI layer 552, to further train and refine the convolutional neural network. Following off-page connector 2 to FIG. 5*a*, in block 598, the method is done.

Figure 6:
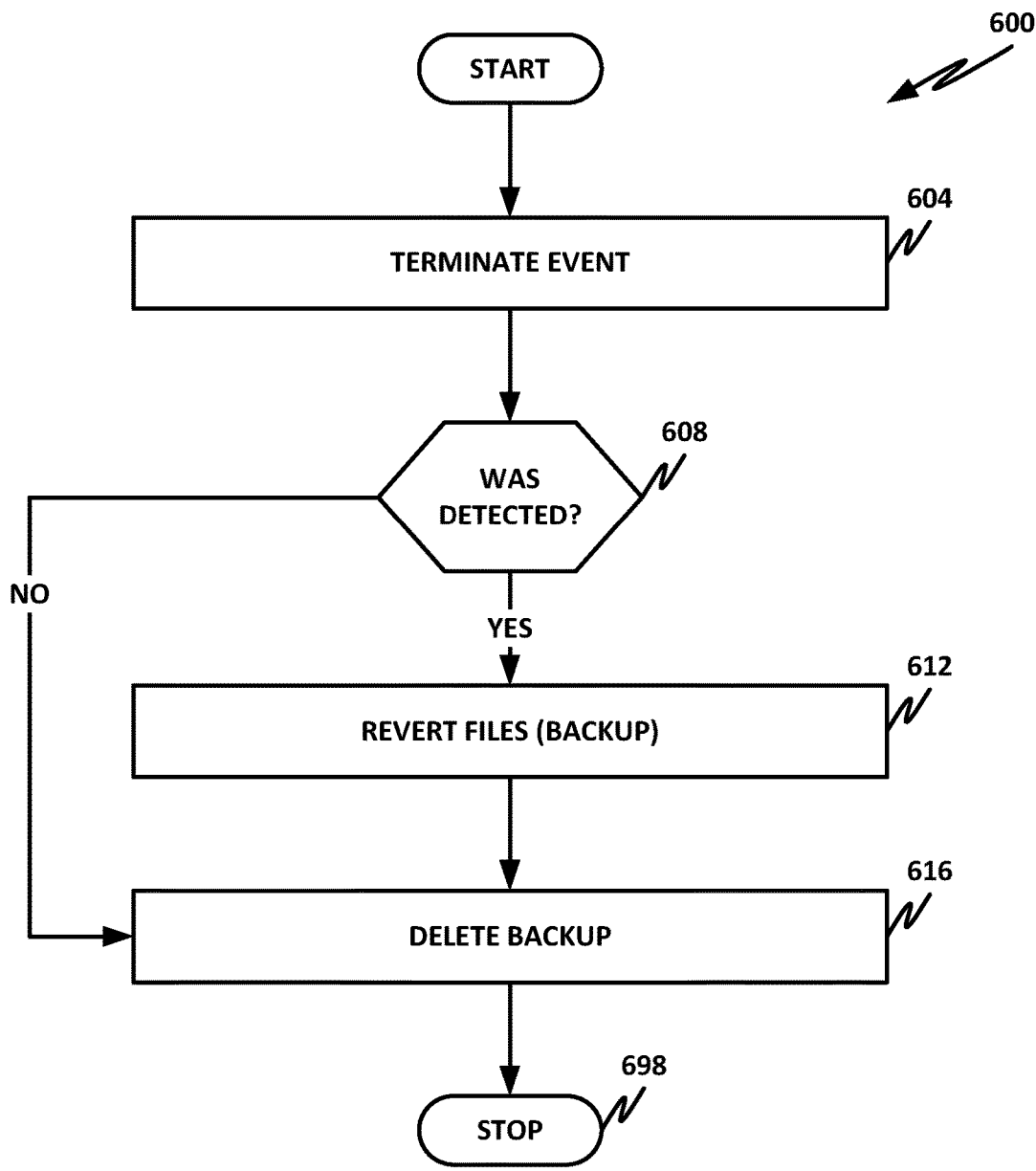
FIG. 6 is a flowchart of a method for providing a process events workflow, according to the teachings of the present specification.

FIG. 6 is a flowchart of a method 600 for providing a process events workflow, according to the teachings of the present specification. Process events workflow 600 is provided specifically to deal with the offending process that resulted in a compromised file, as determined by method 500 of FIGS. 5*a* and 5*b*.

In block 604, the system may terminate the offending event to prevent further harm to the file system or compromise of additional files.

In decision block 608, the system determines whether a ransomware event was detected. For example, the ransomware event may be detected by method 500 of FIGS. 5*a* and 5*b*, or by another appropriate method.

If ransomware was not detected, then in block 616, the backup (e.g., a transitory or some other backup) may be optionally deleted as it may no longer be required.

Returning to decision block 608, if a file compromise event was detected, then in block 612 the file may be reverted to its backup state.

Again in block 616, now that the backup (such as a transitory backup) has served its purpose, it may no longer be necessary, and in block 616, the backup may be deleted. In block 698, the method is done.

Figure 7:
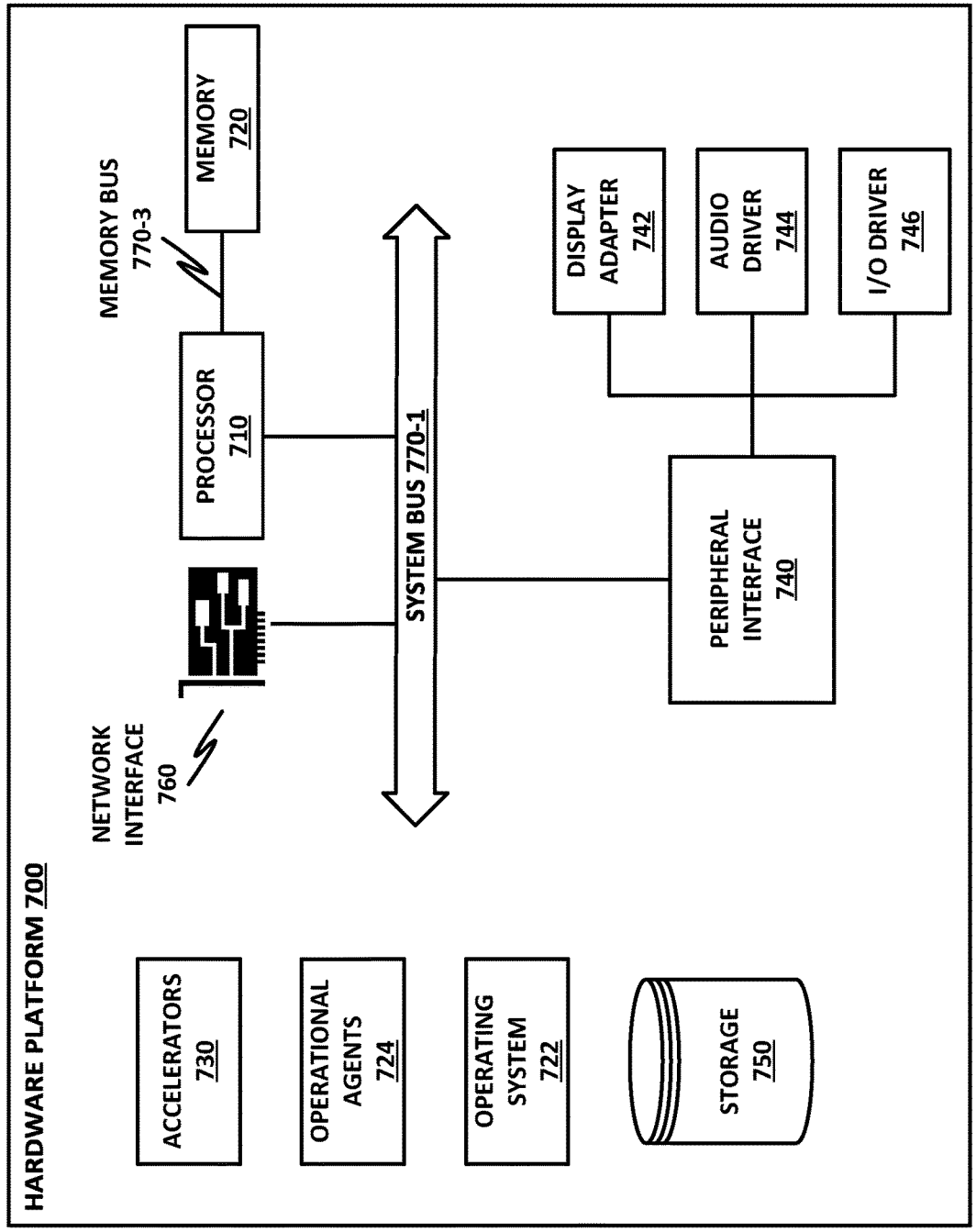
FIG. 7 is a block diagram of a hardware platform, according to the teachings of the present specification.

FIG. 7 is a block diagram of hardware platform 700, according to the teachings of the present specification. Embodiments of hardware platform 700 may be adapted or configured to provide the method of detecting ransomware disclosed herein.

FIG. 7 may represent either a client device or a server device, as described in this specification, particularly as illustrated in FIG. 4. Operational agents 724 may provide embodiments of a ransomware remediation engine, or of selected elements of a ransomware remediation engine, as illustrated herein. Further, accelerators 730 may provide hardware acceleration for certain elements. By way of nonlimiting example, an FTI layer such as FTI layer 220 or heuristic layer 216 may be particularly suitable for acceleration in hardware accelerators 730.

In one particular embodiment, accelerators 730 contain a number of FPGAs or GPUs configured to operate in parallel and to provide a CNN configured to provide an FTI layer, as described herein.

Hardware platform 700 may represent any suitable computing device. In various embodiments, a 'computing device' may be or comprise, by way of nonlimiting example, a computer, workstation, server, mainframe, virtual machine (whether emulated or on a 'bare metal' hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a 'local host,' while any computing device external to it may be designated as a 'remote host.'

In certain embodiments, client devices 110, home gateway 108, and the IoT devices illustrated in FIG. 1 may all be examples of devices that run on a hardware platform such as hardware platform 700. FIG. 7 presents a view of many possible elements that may be included in a hardware platform, but it should be understood that not all of these are necessary in every platform, and platforms may also include other elements. For example, peripheral interface 740 may be an essential component in a user-class device to provide input and output, while it may be completely unnecessary in a virtualized server or hardware appliance that communicates strictly via networking protocols.

By way of illustrative example, hardware platform 700 provides a processor 710 connected to a memory 720 and other system resources via one or more buses, such a system bus 770-1 and a memory bus 770-3.

Other components of hardware platform 700 include a storage 750, network interface 760, and peripheral interface 740. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 720 and storage 750, for example, in a single physical memory device, and in other cases, memory 720 and/or storage 750 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 760 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, 'logic elements' may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a 'processor' may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 710 may be treated as only one core of a multi-core processor, or may be treated as the entire multi-core processor, as appropriate. In some embodiments, one or more co-processors may also be provided for specialized or support functions.

Processor 710 may be communicatively coupled to devices via a system bus 770-1. As used throughout this specification, a 'bus' includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 770-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 710 is communicatively coupled to memory 720 via memory bus 770-3, which may be, for example, a direct memory access (DMA) bus, though other memory architectures are possible, including ones in which memory 720 communicates with processor 710 via system bus 770-1 or some other bus. In the same or an alternate embodiment, memory bus 770-3 may include remote direct memory access (RDMA), wherein processor 710 accesses disaggregated memory resources via DMA or DMA-like interfaces.

To simplify this disclosure, memory 720 is disclosed as a single logical block, but in a physical embodiment may include one or more blocks of any suitable volatile or nonvolatile memory technology or technologies, including, for example, double data rate random access memory (DDR RAM), static random access memory (SRAM), dynamic random access memory (DRAM), persistent random access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 720 may comprise a relatively low-latency volatile main memory, while storage 750 may comprise a relatively higher-latency nonvolatile memory. However, memory 720 and storage 750 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 750 may be any species of memory 720, or may be a separate device. Storage 750 may include one or more non-transitory computer-readable mediums, including, by way of nonlimiting example, a hard drive, solid-state drive, external storage, microcode, hardware instructions, redundant array of independent disks (RAID), network attached storage, optical storage, tape drive, backup system, cloud storage, or any combination of the foregoing. Storage 750 may be, or may include therein, a database or databases or data stored in other configurations, and may include a stored copy of operational software such as operating system 722 and software portions, if any, of operational agents 724, accelerators 730 (which may be provided as FPGAs, ASICs, or other programmable, integrated circuits by way of nonlimiting example), or other engines. Many other configurations are also possible, and are intended to be encompassed within the broad scope of this specification.

As necessary, hardware platform 700 may include an appropriate operating system, such as Microsoft Windows, Linux, Android, Mac OSX, Apple iOS, Unix, or similar.

Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 700 may be configured for virtualization or containerization, in which case it may also provide a hypervisor, virtualization platform, virtual machine manager (VMM), orchestrator, containerization platform, or other infrastructure to provide flexibility in allocating resources.

Network interface 760 may be provided to communicatively couple hardware platform 700 to a wired or wireless network or fabric. A 'network,' as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 724 are one or more computing engines that may include one or more non-transitory computer-readable mediums having stored thereon executable instructions operable to instruct a processor to provide operational functions. At an appropriate time, such as upon booting hardware platform 700 or upon a command from operating system 722 or a user or security administrator, processor 710 may retrieve a copy of operational agents 724 (or software portions thereof) from storage 750 and load it into memory 720. Processor 710 may then iteratively execute the instructions of operational agents 724 to provide the desired methods or functions.

As used throughout this specification, an 'engine' includes any combination of one or more logic elements, of similar or dissimilar species, operable for and configured to perform one or more methods provided by the engine. In some cases, the engine may include a special integrated circuit designed to carry out a method or a part thereof, an FPGA programmed to provide a function, other programmable logic, and/or software instructions operable to instruct a processor to perform the method. In some cases, the engine may run as a 'daemon' process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a 'driver space' associated with ring 0, 1, or 2 in a protection ring architecture. The engine may also include other hardware and software, including configuration files, registry entries, application programming interfaces (APIs), and interactive or user mode software by way of nonlimiting example.

Peripheral interface 740 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 742, audio driver 744, and input/output (I/O) driver 746. Display adapter 742 may be configured to provide a human-readable visual output, such as a command-line interface (CLI) or graphical desktop such as Microsoft Windows, Apple OSX desktop, or a Unix/Linux X Window System-based desktop. Display adapter 742 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 742 may include a hardware graphics card, which may have its own memory and its own graphics processing unit (GPU). Audio driver 744 may provide an interface for audible sounds, and may include in some examples a hardware sound card. Sound output may be provided in analog (such as a 3.5 mm stereo jack), component ('RCA') stereo, or in a digital audio format such as S/PDIF, AES3, AES47, HDMI, USB, Bluetooth or Wi-Fi audio, by way of nonlimiting example.

FIG. 8 is a block diagram of a network function virtualization (NFV) architecture 800, according to the teachings of the present specification. Embodiments of NFV architecture 800 may be adapted or configured to provide the method of detecting ransomware disclosed herein.

In some cases, certain aspects of a server, such as an antivirus or enterprise server, may be provided within a virtual machine 804. In these cases, resources are virtualized, and some operations such as a CNN or certain hardware operations may be offloaded to an accelerator such as accelerator 730 of FIG. 7.

NFV is an aspect of network virtualization that is generally considered distinct from, but that can still interoperate with, a software-defined network (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ('spun up') or removed ('spun down') to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 8, an NFV orchestrator 801 manages a number of the VNFs 812 running on an NFVI 800. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 801 a valuable system resource. Note that NFV orchestrator 801 may provide a browser-based or graphical configuration interface, and in some embodiments may be integrated with SDN orchestration functions.

Note that NFV orchestrator 801 itself may be virtualized (rather than a special-purpose hardware appliance). NFV orchestrator 801 may be integrated within an existing SDN system, wherein an operations support system (OSS) manages the SDN. This may interact with cloud resource management systems (e.g., OpenStack) to provide NFV orchestration. An NFVI 800 may include the hardware, software, and other infrastructure to enable VNFs to run. This may include a hardware platform 802 on which one or more VMs 804 may run. For example, hardware platform 802-1 in this example runs VMs 804-1 and 804-2. Hardware platform 802-2 runs VMs 804-3 and 804-4. Each hardware platform may include a hypervisor 820, VMM, or similar function, which may include and run on a native (bare metal) operating system, which may be minimal so as to consume very few resources.

Hardware platforms 802 may be or comprise a rack or several racks of blade or slot servers (including, e.g., processors, memory, and storage), one or more data centers, other hardware resources distributed across one or more geographic locations, hardware switches, or network interfaces. An NFVI 800 may also include the software architecture that enables hypervisors to run and be managed by NFV orchestrator 801.

Running on NFVI 800 are a number of VMs 804, each of which in this example is a VNF providing a virtual service appliance. Each VM 804 in this example includes an instance of the Data Plane Development Kit (DPDK), a virtual operating system 808, and an application providing the VNF 812.

Virtualized network functions could include, as nonlimiting and illustrative examples, firewalls, intrusion detection systems, load balancers, routers, session border controllers, DPI services, network address translation (NAT) modules, or call security association.

The illustration of FIG. 8 shows that a number of VNFs 804 have been provisioned and exist within NFVI 800. This FIGURE does not necessarily illustrate any relationship between the VNFs and the larger network, or the packet flows that NFVI 800 may employ.

The illustrated DPDK instances 816 provide a set of highly-optimized libraries for communicating across a virtual switch (vSwitch) 822. Like VMs 804, vSwitch 822 is provisioned and allocated by a hypervisor 820. The hypervisor uses a network interface to connect the hardware platform to the data center fabric (e.g., a fabric interconnect). This fabric interconnect may be shared by all VMs 804 running on a hardware platform 802. Thus, a vSwitch may be allocated to switch traffic between VMs 804. The vSwitch may be a pure software vSwitch (e.g., a shared memory vSwitch), which may be optimized so that data are not moved between memory locations, but rather, the data may stay in one place, and pointers may be passed between VMs 804 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 822 is illustrated, wherein vSwitch 822 is shared between two or more physical hardware platforms 802.

Figure 9:
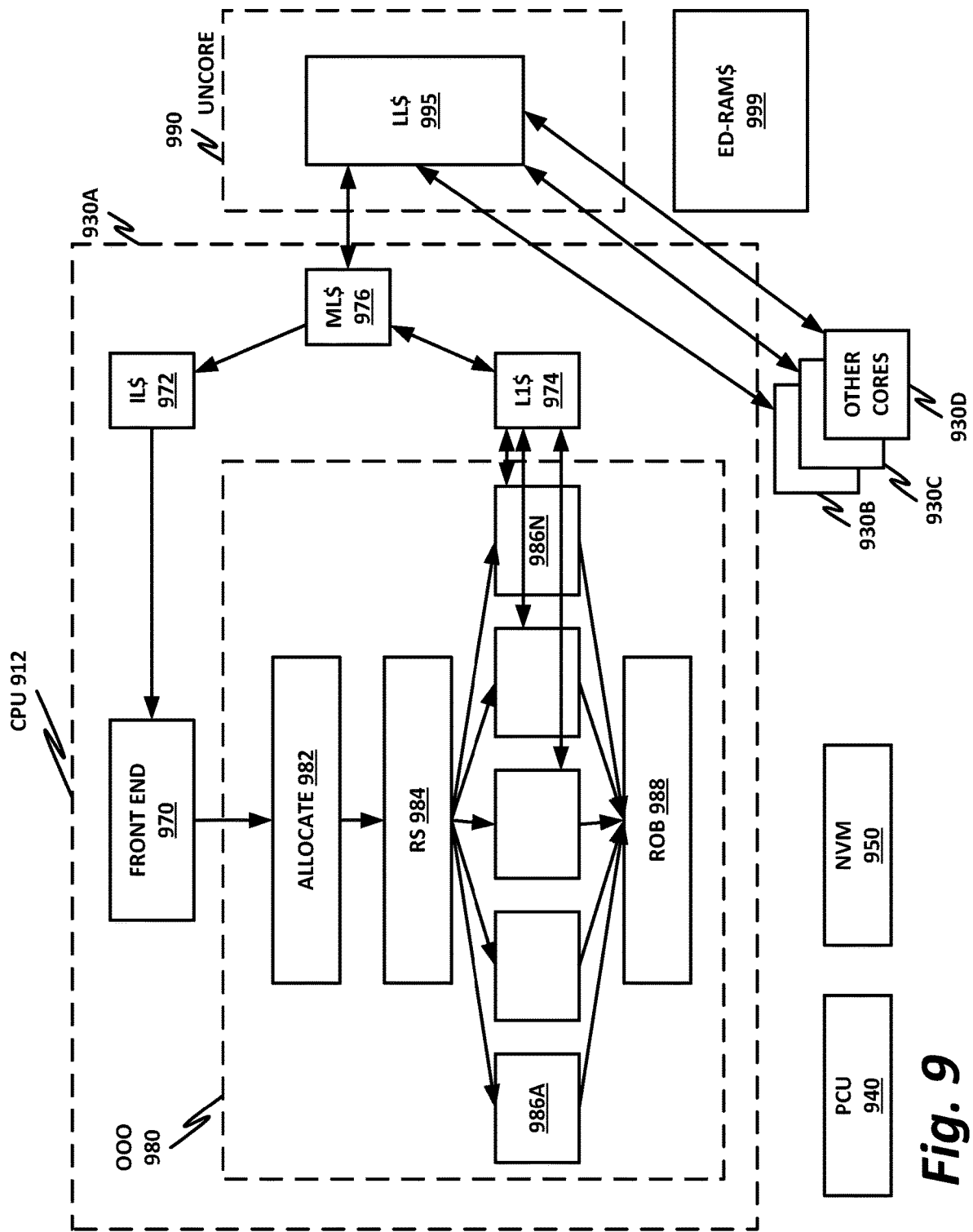
FIG. 9 is a block diagram of a central processing unit (CPU), according to the teachings of the present specification.

FIG. 9 is a block diagram of a CPU 912, according to the teachings of the present specification. Embodiments of CPU 912 may be adapted or configured to provide the method of detecting ransomware disclosed herein. Specifically, CPU 912 may provide hardware support for performing a method such as at least some aspects of method 500 of FIG. 5.

Although CPU 912 depicts a particular configuration, the cores and other components of CPU 912 may be arranged in any suitable manner. CPU 912 may comprise any processor or processing device, such as a microprocessor, an embedded processor, a digital signal processor (DSP), a network processor, an application processor, a co-processor, a system on a chip (SoC), or other device to execute code. CPU 912, in the depicted embodiment, includes four processing elements (cores 930 in the depicted embodiment), which may include asymmetric processing elements or symmetric processing elements. However, CPU 912 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 930A includes an out-of-order processor that has a front end unit 970 used to fetch incoming instructions, perform various processing (e.g., caching, decoding, branch predicting, etc.) and passing instructions/operations along to an out-of-order (OOO) engine. The OOO engine performs further processing on decoded instructions.

A front end 970 may include a decode module coupled to fetch logic to decode fetched elements. Fetch logic, in one embodiment, includes individual sequencers associated with thread slots of cores 930. Usually, a core 930 is associated with a first ISA, which defines/specifies instructions executable on core 930. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 930, in one embodiment, recognize the same ISA (or a subset thereof). Alternatively, in a heterogeneous core environment, a decoder of one or more cores (e.g., core 930B) may recognize a second ISA (either a subset of the first ISA or a distinct ISA).

In the embodiment depicted, the OOO engine includes an allocate unit 982 to receive decoded instructions, which may be in the form of one or more micro-instructions or uops, from front end unit 970, and allocate them to appropriate resources such as registers and so forth. Next, the instructions are provided to a reservation station 984, which reserves resources and schedules them for execution on one of a plurality of execution units 986A-986N. Various types of execution units may be present, including, for example, arithmetic logic units (ALUs), load and store units, vector processing units (VPUs), and floating point execution units, among others. Results from these different execution units are provided to a reorder buffer (ROB) 988, which take unordered results and return them to correct program order.

In the embodiment depicted, both front end unit 970 and 000 engine 980 are coupled to different levels of a memory hierarchy. Specifically shown is an instruction level cache 972, that in turn couples to a mid-level cache 976, that in turn couples to a last level cache 995. In one embodiment, last level cache 995 is implemented in an on-chip (sometimes referred to as uncore) unit 990. Uncore 990 may communicate with system memory 999, which, in the illustrated embodiment, is implemented via embedded DRAM (eDRAM). The various execution units 986 within OOO engine 980 are in communication with a first level cache 974 that also is in communication with mid-level cache 976. Additional cores 930B-930D may couple to last level cache 995 as well.

In particular embodiments, uncore 990 may be in a voltage domain and/or a frequency domain that is separate from voltage domains and/or frequency domains of the cores. That is, uncore 990 may be powered by a supply voltage that is different from the supply voltages used to power the cores and/or may operate at a frequency that is different from the operating frequencies of the cores.

CPU 912 may also include a power control unit (PCU) 940. In various embodiments, PCU 940 may control the supply voltages and the operating frequencies applied to each of the cores (on a per-core basis) and to the uncore. PCU 940 may also instruct a core or uncore to enter an idle state (where no voltage and clock are supplied) when not performing a workload.

In various embodiments, PCU 940 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 940 may detect stress characteristics at any suitable interval.

In various embodiments, PCU 940 is a component that is discrete from the cores 930. In particular embodiments, PCU 940 runs at a clock frequency that is different from the clock frequencies used by cores 930. In some embodiments where the PCU is a microcontroller, PCU 940 executes instructions according to an ISA that is different from an ISA used by cores 930.

In various embodiments, CPU 912 may also include a nonvolatile memory 950 to store stress information (such as stress characteristics, incremental stress values, accumulated stress values, stress accumulation rates, or other stress information) associated with cores 930 or uncore 990, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including CPU package. An SoC represents an integrated circuit (IC) that integrates components of a computer or other electronic system into a single chip. Thus, for example, client devices 110 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in ASICs, FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein.

Accordingly, the associated infrastructure has a myriad of substitute arrangements, design choices, device possibilities, hardware configurations, software implementations, and equipment options.

In a general sense, any suitably-configured processor, such as processor 710, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 750 may store information in any suitable type of tangible, non-transitory storage medium (for example, random access memory (RAM), ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 720 and storage 750, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 710 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words 'means for' or 'steps for' are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a ransomware mitigation engine, comprising: a processor; a convolutional neural network configured to provide file type identification (FTI) services comprising: identifying an access operation of a file as a write to the file or newly creating the file; computing a byte correlation factor for the file; classifying the file as belonging to a file type; determining with a screening confidence that the file type is correct for the file; determining that the screening confidence is below a screening confidence threshold; and circuitry and logic to provide heuristic analysis comprising: receiving notification that the confidence is below the confidence threshold; performing a statistical analysis of the file to determine a difference between an expected value and a computed value; determining from the difference, with a detection confidence, that the file has been compromised; and identifying the file as having been compromised by a ransomware attack.

There is further disclosed a ransomware mitigation engine, wherein the statistical analysis is selected from the group consisting of entropy, Monte Carlo pi, Monte Carlo pi error, serial correlation coefficient, arithmetic mean, and chi square distribution.

There is further disclosed a ransomware mitigation engine, wherein determining that the file has been compromised comprises identifying a statistically-significant mismatch in two or more statistical analyses from the group.

There is further disclosed a ransomware mitigation engine, wherein the CNN is a featureless CNN.

There is further disclosed a ransomware mitigation engine, further comprising a backup manager configured to create a backup of the file and to restore the file from the backup.

There is further disclosed a ransomware mitigation engine, wherein the backup is a transitory backup.

There is further disclosed a ransomware mitigation engine, further comprising a file artefact extractor configured to identify a malicious process according to file artefacts.

There is further disclosed a ransomware mitigation engine, further comprising a file system input/output filter configured to register file operation hooks with an operating system.

There is further disclosed a ransomware mitigation engine, further comprising a policy engine configured to apply a remediation policy responsive to the identifying.

There is further disclosed a ransomware mitigation engine, wherein the policy engine is further configured to identify and remediate a process that instigated the file access operation.

There is further disclosed a ransomware mitigation engine, wherein the circuitry and logic comprise a processor and one or more tangible, non-transitory computer-readable storage mediums having stored thereon executable instructions to instruct the processor to provide the heuristic layer.

There is further disclosed a ransomware mitigation engine, wherein the CNN comprises a hardware accelerator.

There is further disclosed a ransomware mitigation engine, wherein the CNN comprises a field-programmable gate array (FPGA).

There is further disclosed a ransomware mitigation engine, wherein the CNN comprises a bank of GPUs.

There is further disclosed a ransomware mitigation engine, wherein the CNN comprises an ASIC.

There are also disclosed one or more tangible, non-transitory computer-readable storage mediums having stored thereon executable instructions to program or configure a logic device to provide a ransomware mitigation engine, the ransomware mitigation engine to: identify an access operation of a file as a write to the file or newly creating the file; operate a convolutional neural network (CNN) file type identification (FTI) layer to determine with a screening confidence that the file type is correct for the file, and that the screening confidence is below a screening confidence threshold; perform a statistical analysis of the file to determine a difference between an expected value and a computed value; determine from the difference that the file has been compromised and that the file has been compromised by ransomware.

There are further disclosed one or more tangible, non-transitory computer-readable mediums, wherein the statistical analysis is selected from the group consisting of entropy, Monte Carlo pi, Monte Carlo pi error, serial correlation coefficient, arithmetic mean, and chi square distribution.

There are further disclosed one or more tangible, non-transitory computer-readable mediums, wherein determining that the file has been compromised comprises identifying a statistically-significant mismatch in two or more statistical analyses from the group.

There are further disclosed one or more tangible, non-transitory computer-readable mediums, wherein the CNN is a featureless CNN.

There are further disclosed one or more tangible, non-transitory computer-readable mediums, wherein the instructions are further to provide a backup manager configured to create a backup of the file and to restore the file from the backup.

There are further disclosed one or more tangible, non-transitory computer-readable mediums, wherein the backup is a transitory backup.

There are further disclosed one or more tangible, non-transitory computer-readable mediums, wherein the instructions are further to provide a file artefact extractor to identify a malicious process according to file artefacts.

There are further disclosed one or more tangible, non-transitory computer-readable mediums, wherein the instructions are further to provide a file system input/output filter to register file operation hooks with an operating system.

There are further disclosed one or more tangible, non-transitory computer-readable mediums, wherein the instructions are further to provide a policy engine to apply a remediation policy responsive to the identifying.

There are further disclosed one or more tangible, non-transitory computer-readable mediums, wherein the policy engine is further configured to identify and remediate a process that instigated the file access operation.

There are further disclosed one or more tangible, non-transitory computer-readable mediums, further comprising instructions to program the logic device to provide the CNN, wherein the CNN is to compute a byte correlation for the file and classify the file as belonging to a file type according to the byte correlation.

There are further disclosed one or more tangible, non-transitory computer-readable mediums, wherein the CNN comprises a hardware accelerator.

There are further disclosed one or more tangible, non-transitory computer-readable mediums, wherein the CNN comprises a field-programmable gate array (FPGA).

There are further disclosed one or more tangible, non-transitory computer-readable mediums, wherein the CNN comprises a bank of GPUs.

There are further disclosed one or more tangible, non-transitory computer-readable mediums, wherein the CNN comprises an ASIC.

There is also disclosed a method of detecting and remediating a ransomware attack, comprising: operating a neural network to compute a byte correlation factor for a file under inspection; classifying the file under inspection as belonging to a file type according to the byte correlation; determine that the file type is incorrect for the file under inspection;

performing a statistical analysis of the file under inspection to determine a difference between an expected value and a computed value; and determining from the difference that the file under inspection has been compromised by a ransomware attack.

There is further disclosed a method, wherein the statistical analysis is selected from the group consisting of entropy, Monte Carlo pi, Monte Carlo pi error, serial correlation coefficient, arithmetic mean, and chi square distribution.

There is further disclosed a method, wherein determining that the file under inspection has been compromised comprises identifying a statistically-significant mismatch in two or more statistical analyses from the group.

There is further disclosed a method, wherein the neural network is a featureless neural network.

There is further disclosed a method, further comprising creating a backup of the file and restoring the file from the backup.

There is further disclosed a method, wherein the backup is a transitory backup.

There is further disclosed a method, further comprising identifying a malicious process according to file artefacts.

There is further disclosed a method, further comprising registering file operation hooks with an operating system.

There is further disclosed a method, further complying applying a remediation policy responsive to the identifying.

There is further disclosed a method, further comprising identifying and remediating a process that instigated the file access operation.

There is further disclosed an apparatus comprising means for performing the method of a number of the above examples.

There is further disclosed an apparatus, wherein the means comprise one or more tangible, non-transitory computer-readable storage mediums having stored thereon executable instructions to instruct a processor to provide a heuristic layer.

There is further disclosed an apparatus, wherein the means comprise a convolutional neural network.

There is further disclosed an apparatus, wherein the CNN comprises a field-programmable gate array (FPGA).

There is further disclosed an apparatus, wherein the CNN comprises a bank of GPUs.

There is further disclosed an apparatus, wherein the CNN comprises an ASIC.

What is claimed is:

1. A ransomware mitigation engine, comprising:
a processor;
a convolutional neural network configured to provide file type identification (FTI) services comprising:
identifying an access operation of a file as a write to the file or newly creating the file;
computing a byte correlation factor for the file;
classifying the file as belonging to a file type;
determining with a screening confidence that the file type is correct for the file;
determining that the screening confidence is below a screening confidence threshold; and
circuitry and logic to provide heuristic analysis comprising:
receiving notification that the confidence is below the confidence threshold;
performing a statistical analysis of the file to determine a difference between an expected value and a computed value;
determining from the difference, with a detection confidence, that the file has been compromised; and
identifying the file as having been compromised by a ransomware attack.

2. The ransomware mitigation engine of claim 1, wherein the statistical analysis is selected from the group consisting of entropy, Monte Carlo pi, Monte Carlo pi error, serial correlation coefficient, arithmetic mean, and chi square distribution.

3. The ransomware mitigation engine of claim 2, wherein determining that the file has been compromised comprises identifying a statistically-significant mismatch in two or more statistical analyses from the group.

4. The ransomware mitigation engine of claim 1, wherein the CNN is a featureless CNN.

5. The ransomware mitigation engine of claim 1, further comprising a backup manager configured to create a backup of the file and to restore the file from the backup.

6. The ransomware mitigation engine of claim 5, wherein the backup is a transitory backup.

7. The ransomware mitigation engine of claim 1, further comprising a file artefact extractor configured to identify a malicious process according to file artefacts.

8. The ransomware mitigation engine of claim 1, further comprising a file system input/output filter configured to register file operation hooks with an operating system.

9. The ransomware mitigation engine of claim 1, further comprising a policy engine configured to apply a remediation policy responsive to the identifying.

10. The ransomware mitigation engine of claim 9, wherein the policy engine is further configured to identify and remediate a process that instigated the file access operation.

11. The ransomware mitigation engine of claim 1, wherein the circuitry and logic comprise a processor and one or more tangible, non-transitory computer-readable storage mediums having stored thereon executable instructions to instruct the processor to provide the heuristic layer.

12. The ransomware mitigation engine of claim 1, wherein the CNN comprises a hardware accelerator.

13. The ransomware mitigation engine of claim 1, wherein the CNN comprises a field-programmable gate array (FPGA).

14. The ransomware mitigation engine of claim 1, wherein the CNN comprises a bank of GPUs.

15. The ransomware mitigation engine of claim 1, wherein the CNN comprises an ASIC.

16. One or more tangible, non-transitory computer-readable storage mediums having stored thereon executable instructions to program or configure a logic device to provide a ransomware mitigation engine, the ransomware mitigation engine to:
identify an access operation of a file as a write to the file or newly creating the file;
operate a convolutional neural network (CNN) file type identification (FTI) layer to determine with a screening confidence that the file type is correct for the file, and that the screening confidence is below a screening confidence threshold;
perform a statistical analysis of the file to determine a difference between an expected value and a computed value; determine from the difference that the file has been compromised and that the file has been compromised by ransomware.

17. The one or more tangible, non-transitory computer-readable mediums of claim 16, wherein the instructions are further to provide a file artefact extractor to identify a malicious process according to file artefacts.

18. The one or more tangible, non-transitory computer-readable mediums of claim 16, further comprising instructions to program the logic device to provide the CNN, wherein the CNN is to compute a byte correlation for the file and classify the file as belonging to a file type according to the byte correlation.

19. A method of detecting and remediating a ransomware attack, comprising:
- operating a neural network to compute a byte correlation factor for a file under inspection;
- classifying the file under inspection as belonging to a file type according to the byte correlation;
- determine that the file type is incorrect for the file under inspection;
- performing a statistical analysis of the file under inspection to determine a difference between an expected value and a computed value; and
- determining from the difference that the file under inspection has been compromised by a ransomware attack.

20. The method of claim 19, wherein the statistical analysis is selected from the group consisting of entropy, Monte Carlo pi, Monte Carlo pi error, serial correlation coefficient, arithmetic mean, and chi square distribution.

\* \* \* \* \*

UNITED STATES PATENT AND TRADEMARK OFFICE
CERTIFICATE OF CORRECTION

PATENT NO. : 10,795,994 B2
APPLICATION NO. : 16/142316
DATED : October 6, 2020
INVENTOR(S) : Kunal Mehta et al.

Page 1 of 1

It is certified that error appears in the above-identified patent and that said Letters Patent is hereby corrected as shown below:

In the Drawings

On sheet 6 of 10, in FIG. 5b, Line 1, Reference Numeral 580, delete "TELEMTRY" and insert --TELEMETRY--, therefor.

Signed and Sealed this
Eighth Day of December, 2020

Andrei Iancu
*Director of the United States Patent and Trademark Office*